US012709697B2

(12) United States Patent
Sudhanva

(10) Patent No.: US 12,709,697 B2
(45) Date of Patent: Aug. 18, 2026

(54) (METH)ACRYLATE-FUNCTIONAL RADIATION CURABLE COMPOSITIONS FOR ADDITIVE FABRICATION

(71) Applicant: Stratasys, Inc., Minnetonka, MN (US)

(72) Inventor: Govindarajan Sudhanva, Elgin, IL (US)

(73) Assignee: Stratasys, Inc., Minnetonka, MN (US)

( * ) Notice: Subject to any disclaimer, the term of this patent is extended or adjusted under 35 U.S.C. 154(b) by 84 days.

(21) Appl. No.: 18/034,458

(22) PCT Filed: Oct. 27, 2021

(86) PCT No.: PCT/EP2021/079885
§ 371 (c)(1),
(2) Date: Apr. 28, 2023

(87) PCT Pub. No.: WO2022/090342
PCT Pub. Date: May 5, 2022

(65) Prior Publication Data

US 2023/0407132 A1 Dec. 21, 2023

Related U.S. Application Data

(60) Provisional application No. 63/106,382, filed on Oct. 28, 2020.

(51) Int. Cl.
*C09D 175/14* (2006.01)
*C08G 18/04* (2006.01)
*C08G 18/12* (2006.01)

(52) U.S. Cl.
CPC .......... *C09D 175/14* (2013.01); *C08G 18/04* (2013.01); *C08G 18/12* (2013.01)

(58) Field of Classification Search
None
See application file for complete search history.

(56) References Cited

U.S. PATENT DOCUMENTS 9,796,863 B2 10/2017 Suzuki et al.
10,799,911 B2 * 10/2020 Hall .......................... C09D 11/36
11,485,818 B2 * 11/2022 Govindarajan ......... G03F 7/027

FOREIGN PATENT DOCUMENTS

WO 2019204807 A1 10/2019
WO 2019213585 A1 11/2019

OTHER PUBLICATIONS

International Search Report, ISA/EP, PCT/EP2021/079885, dated Feb. 4, 2022, 3 pages.
International Written Opinion, ISA/EP, PCT/EP2021/079885, dated Feb. 16, 2022, 6 pages.

* cited by examiner

*Primary Examiner* — Sanza L. McClendon
(74) *Attorney, Agent, or Firm* — Faegre Drinker Biddle & Reath LLP

(57) ABSTRACT

Described herein are thermoset compositions and kits of compositions suitable for use in additive fabrication processes including specified concentrations of reactive compounds including urethane-(meth)acrylate compounds, monofunctional diluent monomers, and methacrylate-functional compounds having 1.5 polymerizable groups or more. Also described and claimed are methods of creating three-dimensional parts via additive fabrication processes utilizing the compositions elsewhere herein described and claimed, as well as the articles cured therefrom.

15 Claims, No Drawings

(METH)ACRYLATE-FUNCTIONAL RADIATION CURABLE COMPOSITIONS FOR ADDITIVE FABRICATION

CROSS-REFERENCE TO RELATED APPLICATIONS

The present application is a 371 U.S. National Phase Application based on International Application No. PCT/EP2021/079885, filed Oct. 27, 2021 and entitled "(METH) ACRYLATE-FUNCTIONAL RADIATION CURABLE COMPOSITIONS FOR ADDITIVE FABRICATION," which claims priority to and the benefit of U.S. Provisional Application Ser. No. 63/106,382, filed Oct. 28, 2020 and entitled "(METH)ACRYLATE-FUNCTIONAL RADIATION CURABLE COMPOSITIONS FOR ADDITIVE FABRICATION," the entire disclosures of which are incorporated herein by reference.

TECHNICAL FIELD

The invention relates to thermosetting compositions and methods for producing three-dimensional objects by additive fabrication techniques, and the articles produced therefrom.

BACKGROUND

Additive fabrication processes for producing three dimensional objects are well known. Additive fabrication processes utilize computer-aided design (CAD) data of an object to build three-dimensional parts. These three-dimensional parts may be formed from liquid resins, powders, or other materials.

Various types of materials are used in additive fabrication processes. Generally, thermoplastic materials are used in, for example fused filament fabrication (FFF) and selective laser sintering (SLS) processes, whereas thermoset materials are used in, for example vat-based processes and processes that involve jetting of liquid materials. Still further additive fabrication processes, such as multi-jet fusion (MJF), may incorporate both liquid thermoset and particulate thermoplastic materials.

Generally, electromagnetic radiation is used to induce rapid curing of the thermosetting materials. The electromagnetic radiation may be UV, visible, or infrared light and may be applied, for example, by lasers, lamps, or LEDs. Non-limiting examples of additive fabrication processes incorporating such light sources include stereolithography (SLA) or digital light processing (DLP). U.S. Pat. No. 9,708,442 describes hybrid-curable materials that are sufficiently fast curing in more modern additive manufacturing systems incorporating LED or DLP-based UV/vis optics.

The electromagnetic radiation may be applied selectively, e.g. by drawing a specific pattern with a laser, using a digital micromirror device (DMD), or a mask, or unselectively, e.g. by passing a lamp over the entirety of a surface. Post-processing by applying additional temperature or light to the newly formed three-dimensional object may be necessary to achieve the desired properties of a three-dimensional object formed from a thermosetting composition.

Many classes of thermosetting materials have been used in additive fabrication processes. One well-known class suitable for use in additive fabrication systems is a "hybrid" curable resin, or one that comprises: (1) epoxies, oxetanes, or other types of cationically polymerizable compounds; (2) one or more cationic photoinitiators; (3) acrylate resins or other types of free radical polymerizable compounds; and (4) one or more free radical photoinitiators. Such resins have become popular for applications requiring cured parts produced via additive fabrication processes with superior mechanical properties that approach engineering thermoplastics. Furthermore, hybrid curable systems are used wherein part warping, curl, or differential shrinkage is desired to be minimized.

Various advances have been made to hybrid-curable thermosetting materials for additive fabrication, either to improve the mechanical properties of the finished article, or to increase the number of additive manufacturing systems into which such systems may be incorporated. However, the ring-opening mechanism of cationic polymerization generally occurs relatively slowly. Another drawback of hybrid-curable systems is their lack of ready biocompatibility. Also, such systems may produce three-dimensional articles which exhibit yellowing over long-term exposure to UV light.

Purely free-radically polymerizable type materials have been known and used even longer than the aforementioned hybrid-based systems in additive fabrication processes. Such radically-polymerizable systems generally consist of one or more acrylate compounds (or other free-radical polymerizable organic compounds) along with a free-radical photoinitiator for radical generation. Although acrylate-containing compounds readily cure under even the relatively lower energy and lower intensity, they are not suitable for all additive fabrication applications. First, acrylate-based resins considered suitable for additive fabrication processes have traditionally produced brittle cured parts and/or yield insufficient mechanical properties to be incorporated into many end-use applications. Also, such resins typically exhibit problems of deformation, such as production of warped or malformed parts, because of residual strain due to the differential shrinkage during curing. Such problems are exacerbated on larger-platform additive fabrication machines, wherein the cumulative differential shrinkage effect amplifies part warping or malformation as cured objects become larger.

Although preferred from a biocompatibility standpoint, methacrylate-based free-radical polymerizable systems useable in additive fabrication processes have traditionally also yielded cured articles with inferior mechanical properties and increased differential shrinkage when compared with leading hybrid-curable materials. Predominantly or all-methacrylate containing compositions are described in, i.a, WO2019204807.

Despite the foregoing, it would be beneficial to provide compositions comprising, consisting, or consisting essentially of acrylate polymerizable compounds, methacrylate polymerizable compounds, or a combination of the two which are capable of ready printability in existing additive fabrication processes, exhibit excellent dimensional stability, and also yield cured articles with superior mechanical properties. An example of existing additive fabrication processes includes top-down, open-vat SLA or DLP processes. An example of cured articles with superior mechanical properties would be those exhibiting simultaneous enhanced elongation at break and Tg. It would further or alternatively be desirable to provide a platform of fast-curing, accurate thermosetting materials which are readily-tunable so as to facilitate the creation of three-dimensional cured articles with a wide range of properties to accommodate the differing requirements of a variety of end-use applications.

BRIEF SUMMARY

Described herein are several embodiments of the invention. According to a first aspect, the invention employs a radiation curable composition for additive fabrication comprising, consisting of, or consisting essentially of a reactive component and an initiator component; wherein the reactive component comprises, consists of, or consists essentially of (i) a urethane (meth)acrylate compound; and (ii) a multifunctional (meth)acrylate compound other than (i); wherein the radiation curable composition is configured to possesses, after a curing process as described elsewhere herein, an E10 value of less than or equal to 30; overall part dimensions will not deviate more than 0.2 mm when printed at an intensity that produces cure depths of 0.100 mm to 0.140 mm with a programmed layer by layer thickness of 0.100 mm. This deviation is measured after 24 hours of conditioning at 22-25° C. and 55-65% relative humidity after post-processing to full conversion using UV and thermal treatment, in a manner as described elsewhere herein. An elongation at break will deviate less than 20% over a 10× rate change in draw speed/strain rate under 100 mm/min, or less than 35% over a 100× rate change in draw speed/strain rate under 500 mm/min. In an embodiment, the composition is configured to possess specified glass transition temperature values, E' peak values, and E' transition onset values, all within a specified temperature range. In other embodiments of the first aspect, the multifunctional (meth)acrylate compound other than (i) is present in an amount of at least 20 wt. % relative to the entire composition. In still further embodiment, a monofunctional acrylate compound is also included in the composition. In yet further embodiments, the composition further includes impact modifiers and/or fillers.

According to a second aspect, the present invention involves a radiation curable composition for additive fabrication comprising, consisting of, or consisting essentially of, relative to the entire weight of the composition, (a) from 40 to 95 wt. %, based on the total weight of the composition, of a urethane (meth)acrylate oligomer having at least one polymerizable group, wherein the urethane (meth)acrylate oligomer is the reaction product of a diisocyanate, a polyether polyol, and a hydroxy-functional (meth)acrylate; (b) from 0 to less than 40 wt. % of a monofunctional reactive diluent monomer; and (c) greater than 20 wt. % of one or more methacrylate-functional compounds comprising a number average of greater than 1.5 polymerizable groups; wherein at least one of the polymerizable groups of the compound according to (c) is (co)polymerizable with the at least one polymerizable group of the oligomer according to (a) and/or (b); and wherein the compound according to (c) possesses a number average molecular weight (Mn) value that is less than the Mn value of the oligomer according to (a) and greater than the Mn of the monomer according to (b).

The compositions described in embodiments of the first and/or second aspect of the invention may be provided as a single composition, or they may be alternatively provided as a kit of materials.

A third aspect of the invention is a method of producing a three-dimensional part via an additive fabrication process, the method comprising: (a) providing a first layer of a radiation curable composition, thereby forming a first surface; (b) optionally, heating at least a portion of the first layer of the radiation curable composition; (c) exposing at least a portion of the first layer of the radiation curable composition imagewise to actinic radiation to form a cured cross-section; (d) providing an additional layer of a radiation curable composition onto at least a portion of the cured cross-section to form an additional layer of the radiation curable composition; (e) exposing at least a portion of the additional layer of the radiation curable composition imagewise to actinic radiation to form an additional cured cross-section; (f) repeating steps (d) and (e) a plurality of times in order to form a three-dimensional object which is the cured product of the radiation curable composition; wherein the radiation curable composition is defined by the composition according to any of the embodiments of the first aspect or the second aspect of the invention.

A fourth aspect is a three-dimensional article which is the cured product of a composition according to any of the embodiments of the first or second aspect and/or created via the method according to any of the embodiments of the third aspect.

Further embodiments of the invention are described below.

BRIEF DESCRIPTION OF THE DRAWINGS

None

DETAILED DESCRIPTION

A first aspect of the invention is a radiation curable composition for additive fabrication comprising, consisting of, or consisting essentially of:

a reactive component and an initiator component;

wherein the reactive component comprises, consists of, or consists essentially of

- i. a urethane (meth)acrylate compound; and
- ii. a multifunctional (meth)acrylate compound other than (i);

wherein the radiation curable composition is configured to possesses, after a curing process as described elsewhere herein, the following:

- (a) an E10 value of less than or equal to 30;
- (b) overall part dimensions will not deviate more than 0.2 mm when printed at an intensity that produces cure depths of 0.100 mm to 0.140 mm with a programmed layer by layer thickness of 0.100 mm, wherein the measurement is taken after and in accordance with a conditioning procedure as described elsewhere herein; and
- (c) an elongation at break will deviate less than 20% over a 10× rate change in draw speed/strain rate under 100 mm/min, or less than 35% over a 100× rate change in draw speed/strain rate under 500 mm/min.

Compositions according to the first aspect of the present invention possess at least a reactive component and an initiator component. Each such component is described in further detail below.

Reactive Component

The compositions according to the present invention comprise a reactive component. As used herein, "reactive" means the ability to form a chemical reaction, preferably a polymerization reaction, with another molecule. As such, a reactive compound will be said to possess at least one reactive, or functional group. It is preferred that such reactive or functional group is a polymerizable group. As used herein and unless otherwise designated, "reactive component" is meant to include any and all different reactive compounds, other than initiators, present in a given composition or kit of materials. Compositions of the first aspect may possess any number of different reactive compounds (or adducts thereof) as prescribed elsewhere herein.

Preferably, the reactive component comprises, consists of, or consists essentially of a urethane (meth)acrylate compound and a multifunctional (meth)acrylate compound other than the urethane (meth)acrylate compound.

Urethane (meth)acrylate compounds contain a urethane linkage or the reaction product of a component possessing a urethane group. Such compounds also are functionalized in the sense that they will possess at least one (meth)acrylate functional group. In an embodiment, the urethane (meth) acrylate compounds according to the first aspect of the present invention contain the reaction product of one or more polyol compounds, isocyanate compounds, and (meth) acrylate compounds. Typically, the urethane (meth)acrylate compound possesses a backbone or central structure defined by the polyol or polyols selected, to which one or more (di)isocyanate compounds are reacted and bonded. Such compounds are preferably terminated at one or more ends by hydroxy-functional (meth)acrylate compounds.

Examples of suitable polyols compounds are polyether polyols, polyester polyols, polycarbonate polyols, polycaprolactone polyols, acrylic polyols, and other polyols. In a preferred embodiment, the polyols selected may comprise polyethylene glycol, polypropylene glycol, poly THF, polybutylene oxide, polyethylene co-propylene oxide, or polyethylene oxide-block-propylene oxide, or mixtures thereof.

These polyols may be used either individually or in combinations of two or more. There are no specific limitations to the manner of polymerization of the structural units in these polyols. Each of random polymerization, block polymerization, or graft polymerization is acceptable.

Given as further examples of the polyether polyols are polyethylene glycol, polypropylene glycol, polypropylene glycol-ethylene glycol copolymer, polytetramethylene glycol, polyhexamethylene glycol, polyheptamethylene glycol, polydecamethylene glycol, and polyether diols obtained by ring-opening copolymerization of two or more ion-polymerizable cyclic compounds. Here, given as examples of the ion-polymerizable cyclic compounds are cyclic ethers such as ethylene oxide, isobutene oxide, tetrahydrofuran, 2-methyltetrahydrofuran, 3-methyltetrahydrofuran, dioxane, trioxane, tetraoxane, cyclohexene oxide, styrene oxide, epichlorohydrin, isoprene monoxide, vinyl oxetane, vinyl tetrahydrofuran, vinyl cyclohexene oxide, phenyl glycidyl ether, butyl glycidyl ether, and glycidyl benzoate. Specific examples of combinations of two or more ion-polymerizable cyclic compounds include combinations for producing a binary copolymer such as tetrahydrofuran and 2-methyltetrahydrofuran, tetrahydrofuran and 3-methyltetrahydrofuran, and tetrahydrofuran and ethylene oxide; and combinations for producing a ternary copolymer such as a combination of tetrahydrofuran, 2-methyltetrahydrofuran, and ethylene oxide, a combination of tetrahydrofuran, butene-1-oxide, and ethylene oxide, and the like. The ring-opening copolymers of these ion-polymerizable cyclic compounds may be either random copolymers or block copolymers.

Included in these polyether polyols are products commercially available under the trademarks, for example, PTMG1000, PTMG2000 (manufactured by Mitsubishi Chemical Corp.), PEG #1000 (manufactured by Nippon Oil and Fats Co., Ltd.), PTG650 (SN), PTG1000 (SN), PTG2000 (SN), PTG3000, PTGL1000, PTGL2000 (manufactured by Hodogaya Chemical Co., Ltd.), PEG200, PEG400, PEG600, PEG1000, PEG1500, PEG2000, PEG4000, PEG6000 (manufactured by Daiichi Kogyo Seiyaku Co., Ltd.) and Pluronics (by BASF).

Polyester diols obtained by reacting a polyhydric alcohol and a polybasic acid are given as examples of the polyester polyols. As examples of the polyhydric alcohol, ethylene glycol, polyethylene glycol, tetramethylene glycol, polytetramethylene glycol, 1,6-hexanediol, 3-methyl-1,5-pentanediol, 1,9-nonanediol, 2-methyl-1,8-octanediol, and the like can be given. As examples of the polybasic acid, phthalic acid, dimer acid, isophthalic acid, terephthalic acid, maleic acid, fumaric acid, adipic acid, sebasic acid, and the like can be given.

These polyester polyol compounds are commercially available under the trademarks such as MPD/IPA500, MPD/IPA1000, MPD/IPA2000, MPD/TPA500, MPD/TPA1000, MPD/TPA2000, Kurapol A-1010, A-2010, PNA-2000, PNOA-1010, and PNOA-2010 (manufactured by Kuraray Co., Ltd.).

As examples of the polycarbonate polyols, polycarbonate of polytetrahydrofuran, poly(hexanediol carbonate), poly (nonanediol carbonate), poly(3-methyl-1,5-pentamethylene carbonate), and the like can be given.

As commercially available products of these polycarbonate polyols, DN-980, DN-981 (manufactured by Nippon Polyurethane Industry Co., Ltd.), Priplast 3196, 3190, 2033 (manufactured by Unichema), PNOC-2000, PNOC-1000 (manufactured by Kuraray Co., Ltd.), PLACCEL CD220, CD210, CD208, CD205 (manufactured by Daicel Chemical Industries, Ltd.), PC-THF-CD (manufactured by BASF), and the like can be given.

In an embodiment, the polyol includes one or more polycaprolactone diols. Polycaprolactone diols are obtained by reacting e-caprolactone and a diol compound are given as examples of the polycaprolactone polyols having a melting point of 0° C. or higher. Here, given as examples of the diol compound are ethylene glycol, polyethylene glycol, polypropylene glycol, polypropylene glycol, tetramethylene glycol, polytetramethylene glycol, 1,2-polybutylene glycol, 1,6-hexanediol, neopentyl glycol, 1,4-cyclohexanedimethanol, 1,4-butanediol, and the like. In an embodiment, the polycaprolactone diol further comprises a primary hydroxyl group.

Commercially available products of these polycaprolactone polyols include PLACCEL 240, 230, 230ST, 220, 220ST, 220NP1, 212, 210, 220N, 210N, L230AL, L220AL, L220PL, L220PM, L212AL (all manufactured by Daicel Chemical Industries, Ltd.), Rauccarb 107 (by Enichem), and the like.

As examples of other polyols ethylene glycol, 1,4-butanediol, 1,5-pentanediol, 1,6-hexanediol, polyoxyethylene bisphenol A ether, polyoxypropylene bisphenol A ether, polyoxyethylene bisphenol F ether, polyoxypropylene bisphenol F ether, and the like can be given.

As these other polyols, those having an alkylene oxide structure in the molecule, in particular polyether polyols, are preferred. In an embodiment, polyols containing polytetramethylene glycol and copolymer glycols of butylene oxide and ethylene oxide are particularly preferred.

In an embodiment, the urethane (meth)acrylate compound comprises the reaction product of a polyol having a theoretical molecular weight or number average molecular weight from 200 to 6000 g/mol, or from 150 to 1000 g/mol, or from about 150 to about 500, or from about 150 to about 300, or from about 150 to about 250 g/mol.

As stated, the urethane (meth)acrylate compound also may include the reaction product of one or more isocyanates. In an embodiment, the isocyanate is a diisocyanate or polyisocyanate. In a preferred embodiment, the isocyanates selected are aliphatic compounds. Any suitable isocyanate compound may be selected, including isophorone diisocyanate, hexane diisocyanate, 2,2,4-trimethyl hexane diisocyanate, 2,4,4-trimethylhexane diisocyanate, pentane diisocyanate or 4,4-methylene bis(cyclohexyl isocyanate), or mixtures thereof.

Given as examples of the polyisocyanate used for the oligomer are 2,4-tolylene diisocyanate, 2,6-tolylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, 1,6-hexane diisocyanate, isophorone diisocyanate, methylenebis(4-cyclohexylisocyanate), 2,2,4-trimethylhexamethylene diisocyanate, bis(2-isocyanato-ethyl)fumarate, 6-isopropyl-1,3-phenyl diisocyanate, 4-diphenylpropane diisocyanate, hydrogenated diphenylmethane diisocyanate, hydrogenated xylylene diisocyanate, tetramethyl xylylene diisocyanate, lysine isocyanate, and the like. These polyisocyanate compounds may be used either individually or in combinations of two or more.

In a preferred embodiment, the urethane (meth)acrylate compound also comprises the reaction product of one or more (meth)acrylate compounds. In a preferred embodiment, the (meth)acrylate compound(s) used are hydroxy-functional. In an embodiment, the urethane (meth)acrylate compound consists only of functional groups which are (meth)acrylate-based compounds. Examples of the hydroxyl group-containing (meth)acrylate used include, (meth)acrylates derived from (meth)acrylic acid and epoxy and (meth) acrylates comprising alkylene oxides, more in particular, 2-hydroxyethyl (meth)acrylate, 2-hydroxypropyl acrylate, 2-hydroxy-3-oxyphenyl (meth)acrylate, and hydroxyethyl caprolactone acrylate, along with any combination thereof.

The urethane (meth)acrylate compound may possess any number of reactive or polymerizable groups. In an embodiment, the urethane (meth)acrylate compound comprises a number average from 0.9 to 2.1 polymerizable groups, or from 0.9 to 1.1 polymerizable groups, or from 0.9 to 3.1 polymerizable groups, or from 2.9 to 3.1 polymerizable groups, or from 1.9 to 2.1 polymerizable groups. In an embodiment, the polymerizable groups comprise or consist of acrylate groups.

In an embodiment, the ratio of polyol, isocyanate, and hydroxyl group-containing (meth)acrylate used for preparing the urethane (meth)acrylate is determined so that about 1.1 to about 3 equivalents of an isocyanate group included in the isocyanate and about 0.1 to about 1.5 equivalents of a hydroxyl group included in the hydroxyl group-containing (meth)acrylate are used for one equivalent of the hydroxyl group included in the polyol.

In the reaction of these three components, a urethanization catalyst such as copper naphthenate, cobalt naphthenate, zinc naphthenate, di-n-butyl tin dilaurate, triethylamine, and triethylenediamine-2-methyltriethyleneamine, or the like may be used. Such catalysts are typically employed in an amount from about 0.01 to about 1 wt. % of the total amount of the reactant. The reaction is carried out at a temperature from about 10 to about 90° C., and preferably from about 30 to about 80° C.

According to various non-limiting embodiments, compositions according to the first aspect of the invention include one or more reactive oligomers. Preferably, the reactive oligomers comprise, consist essentially of, or consist of urethane (meth)acrylate oligomers. An oligomer is used herein to mean a molecule of intermediate relative molecular mass, the structure of which comprises a plurality of units derived, actually or conceptually, from molecules of lower relative molecular mass. As used herein, a component is considered an oligomer if it further possesses a number average molecular weight (Mn) from about 600 g/mol to about 35,000 g/mol. All Mn values referenced herein may be determined preferably via size exclusion chromatography (SEC) methods. A particularly useful SEC method for evaluating the Mn values, including those of urethane (meth) acrylate oligomers is per ASTM: D5296-11: "Standard Test Method for Molecular Weight Averages and Molecular Weight Distribution of Polystyrene by High Performance Size-Exclusion Chromatography," ASTM International, West Conshohocken, PA, (2011). Additionally, ASTM norm D 5226-98: "Standard Practice for Dissolving Polymer Materials," ASTM International, West Conshohocken, PA, (2010), may be used to facilitate the definition of solvents which are appropriate for polymer analysis. To assure accuracy, the Mn values are determined preferably by using a triple detector array. Non-limiting examples of equipment useful for carrying out the aforementioned SEC method include a Viscotek GPCMax VE2001 solvent/sample module system equipped with a TDA302 triple detector array and a PFG linear XL columns from PSS Polymer Standards Service GmbH for chromatographic separation.

Accordingly, in various embodiments, the reactive component includes one or more than one urethane (meth) acrylate oligomers possessing a number average molecular weight from 750 to 10000 g/mol, or from 750 to 6000 g/mol. Oligomers with Mn values below 750 g/mol may not enable sufficiently long crosslinking chains to be established, thereby limiting the physical performance and toughness of the three-dimensional parts cured therefrom. Oligomers possessing Mn values beyond 6000 g/mol, or especially beyond 10000 g/mol may inhibit the cure speed and processability of the radiation curable composition into which they are incorporated, and the resulting viscosity of the entire formulation may rise to levels that render the composition ill-suited for use in many additive fabrication build processes. In another embodiment, the urethane (meth) acrylate oligomer possesses an Mn value from 750 to 10000 g/mol, or 1000 to 7000 g/mol, or 1000 to 6000 g/mol, or 1000 to 5000 g/mol, or 1000 to 4000 g/mol, or 2000 to 8000 g/mol, or 2000 to 7000 g/mol, or 2000 to 6000 g/mol, or 2000 to 5000 g/mol, or 2000 to 4000 g/mol, or 3000 to 8000 g/mol, or 3000 to 7000 g/mol, or 3000 to 6000 g/mol, or 3000 to 5000 g/mol, or 4000 to 8000 g/mol, or 4000 to 7000 g/mol, or 750 to 6000 g/mol; preferably from 750 to 4000 g/mol.

The urethane (meth)acrylate oligomers according to the present invention are selected so as to impart desirable mechanical properties, such as improved toughness, into the three-dimensional objects cured therefrom. It is believed, without wishing to be bound by any theory, that the urethane (meth)acrylate oligomer, particularly if used in higher quantities, has the largest effect on the mechanical properties of the cured network. In order to accomplish this, it is often desirable to select urethane (meth)acrylate oligomers possessing structures and molecular weights that do not yield optimal curing performance or processability in additive fabrication processes. Specific oligomer structures may be designed and utilized depending on the needs of the particular end-use application of the three-dimensional printed parts cured from the composition to be employed.

In an embodiment, the urethane (meth)acrylate compound or compounds are selected so as to possess, whether individually or as a number average of all such compounds, an uncured glass transition temperature (Tg), as measured by differential scanning calorimetry, of less than 10° Celsius, or less than 0° C., or from −50 to 10° C., or from −30 to 10° C., or from −20 to 10° C.

In an embodiment, the urethane (meth)acrylate compound (or alternatively all urethane (meth)acrylate compounds) is present by weight, relative to the entire composition or kit of materials, from 40 to 95 wt. %, or from 50 to 95 wt. %, or from 55 to 95 wt. %, or from 60 to 95 wt. %, or from 65 to 95 wt. %, or from 70 to 95 wt. %, or from 75 to 95 wt. %, or from 80 to 95 wt. %, or from 50 to 90 wt. %, or from 60 to 90 wt. %, or from 60 to 90 wt. %, or from 80 to 90 wt. %, or from 60 to 85 wt. %, or from 65 to 85 wt. %, or from 70 to 85 wt. %.

In addition to the urethane (meth)acrylate compound, compositions according to the first aspect further comprise at least one multifunctional (meth)acrylate compounds other than the aforementioned urethane (meth)acrylate compound. As used herein, "multifunctional" signifies that the pertinent compound possesses a number average of at least 1.9 functional groups per molecule. In an embodiment, the multifunctional (meth)acrylate compound is a difunctional compound, or one with about 2 (a number average of 1.9 to 2.1) functional groups. In another embodiment, the multifunctional (meth)acrylate compound comprises a number average from 1.5 to 3.1 polymerizable groups, or from 1.9 to 3.1 polymerizable groups, or from 1.9 to 2.1 polymerizable groups.

In an embodiment, the multifunctional (meth)acrylate compound is a monomer. A monomer is used herein to mean a molecule of low relative molecular mass, the structure of which can undergo polymerization thereby contributing constitutional units to the essential structure of a macromolecule. As used herein, a compound is a monomer if possesses an Mn value of less than 750 g/mol when measured according to an SEC method, such as ASTM: D5296-11 et seq. as described elsewhere herein, supra. In an embodiment, the multifunctional (meth)acrylate compound, (or the average of the collection of all different multifunctional (meth)acrylate compounds present in the composition or kit of materials) possesses an Mn value from 150 to 750 g/mol, or from 200 to 500 g/mol.

Preferably, the multifunctional (meth)acrylate compound is (co)polymerizable with the urethane (meth)acrylate compound described above. Without wishing to be bound by any theory, Inventors believe that a certain quantity of multifunctional (meth)acrylate compounds are required to be incorporated into the composition in order to facilitate the creation of a rapidly polymerizing "scaffolding" structure which will impart sufficient green strength in the article to be formed, such that the cured part does not deform or collapse upon itself during the additive fabrication build process. With such multifunctional (meth)acrylate compound-induced scaffolding preserving the integrity of the shape of the desired object to be formed, the slower-reacting but toughness-enhancing urethane (meth)acrylate compounds are provided the opportunity to react and crosslink into the overall network structure, imparting superior material performance into the cured object created therefrom.

Some non-limiting examples of multifunctional (meth) acrylate compound may include ethylene glycol di(meth) acrylate, diethylene glycol di(meth)acrylate, triethylene glycol di(meth)acrylate, tetra ethylene glycol di(meth)acrylate, ethoxylated hexane diol di(meth)acrylate, trimethylolpropane ethoxylate, trimethylolpropane di(meth)acrylate, trimethylolpropane tri(meth)acrylate, methyl ether di(meth) acrylate, neopentyl glycol di(meth)acrylate, 1,3-butanediol di(meth)acrylate, glycerol-1,3-diglycerolate di(meth)acrylate, 1,6-hexanediyl bis[oxy-2-hydroxy-3,1-propanediyl]bis (meth)acrylate, pentaerythritol tri(meth)acrylate, or ethoxylated pentaerythritol tri(meth)acrylate, 1,4 butanediol di(meth)acrylate or 1,6 hexane diol di(meth)acrylate, or any combinations thereof. Of course, multiple multifunctional (meth)acrylate compounds, including the specific types herein described, may be used singly or in any combination.

In various embodiments, the multifunctional (meth)acrylate compounds may include or consist of compounds containing methacrylate functional groups. In other embodiments, said compounds consist of methacrylate functional groups, such as, without limitation, bisphenol A glycidyl methacrylate, a triethylene glycol dimethacrylate, a trimethylhexamethylene diisocyanate di(hydroxyethyl)methacrylate, or a methacrylate-terminated isocyanate comprising a methacrylate-terminated moiety and an isocyanate moiety, or mixtures thereof.

It is appreciated that multifunctional urethane (meth) acrylate compounds, and preferably aliphatic urethane-containing compounds, may be used. In an embodiment, the multifunctional (meth)acrylate compounds consists of such (meth)acrylate-functional aliphatic urethane containing compounds. (Meth)acrylate-functional urethane containing compounds involve the reaction product of a (di)isocyanate and a (meth)acrylate.

A variety of any suitable (meth)acrylate-terminated isocyanate comprising a (meth)acrylate-terminated moiety and an isocyanate moiety may be used as the multifunctional (meth)acrylate compound. Usable examples for the (meth) acrylate-terminated moiety include (hydroxyethyl)(meth) acrylate or 2-hydroxypropyl (meth)acrylate, and examples of the isocyanate moiety include hexamethylene diisocyanate, isophorone diisocyanate, tolulene-diisocyanate, or TMXDI. Accordingly, in an embodiment, the multifunctional (meth)acrylate compound(s) comprise(s) HE(M)A-HMDI-HE(M)A, HP(M)A-IPDI-HP(M)A HP(M)A-IPDI-HP(M)A HP(M)A-TDI-HP(M)A HP(M)A-HDI-HP(M)A HP(M)A-HMDI-HP(M)A, or HP(M)A-TMXDI-HP(M)A. For the avoidance of doubt, the utilization of a parenthesis signifies that that both alternatives where the descriptor contained therein is included and not included.

Multifunctional urethane (meth)acrylate compounds further utilize a catalyst in the synthesis process. The catalysts described elsewhere herein in the formation of the urethane (meth)acrylate component are equally suitable for the formation of the compounds described hereunder as well.

The aforementioned multifunctional (meth)acrylate compounds may be used singly or in combinations of two or more. The multifunctional (meth)acrylate compounds may be employed in any suitable amount, but are ideally present in an amount by weight, relative to the entire composition or kit of materials, in an amount that is substantially lower than the urethane (meth)acrylate component. Therefore, in a preferred embodiment, the multifunctional (meth)acrylate compounds are present in an amount, by weight relative to the entire composition or kit of materials, from greater than 15 wt. %, or greater than 20 wt. %; or from 15 to 55 wt. %, or from to 40 wt. %, or from 15 to 30 wt. %, or from 15 to 25 wt. %, or from 20 to 50 wt. %, or from 20 to wt. %, or from 20 to 30 wt. %.

According to certain embodiments of the first aspect, the reactive component may include reactive compounds other than the: (i) urethane (meth)acrylate compounds, and (ii) multifunctional (meth)acrylate compounds other than (i) described herein, supra. In an embodiment, the reactive component further comprises a monofunctional (meth)acrylate compound other than (i).

Monofunctional (meth)acrylate compounds are used preferably as reactive diluent monomers. Reactive diluent monomers are typically incorporated into compositions for additive fabrication because they reduce the viscosity of the overall association composition to a range that is suitable for use in additive fabrication processes, such as jetting or stereolithography. Their incorporation may be particularly useful to achieve processability where higher molecular weight compounds are also incorporated into the formulation. The amount of reactive diluent monomer may be adjusted as appropriate as will be appreciated by the person having ordinary skill in the art to which this invention applies, given the identity of the associated composition as well as the processing conditions of the additive fabrication process with which a composition is associated.

Monofunctional reactive diluent monomers include lower molecular weight monomers containing one double bond. As used herein, “monofunctional” signifies the compound possesses a number average from 0.9 to 1.1 polymerizable groups per molecule. The polymerizable groups are preferably of (meth)acrylate functionality. In an embodiment, each reactive diluent monomer in the composition is methacrylate-functional.

Examples of lower molecular weight monomers containing one double bond include alkyl or hydroxyalkyl (meth) acrylates, for example methyl, ethyl, butyl, 2-ethylhexyl and 2-hydroxyethyl (meth)acrylate, isobornyl (meth)acrylate, and methyl and ethyl (meth)acrylate. Further examples of these monomers are acrylonitrile, acrylamide, (meth)acrylamide, N-substituted (meth)acrylamides, vinyl esters such as vinyl acetate, styrene, alkylstyrenes, halostyrenes, N-vinylpyrrolidone, N-vinyl caprolactam, vinyl chloride and vinylidene chloride. Further examples include, without limitation, ethylene glycol (meth)acrylate, propylene glycol (meth)acrylate, neopentyl glycol (meth)acrylate, hexamethylene glycol (meth)acrylate, bisphenol A (meth)acrylate, vinyl (meth)acrylate, vinyl benzene, vinyl succinate, allyl phthalate, allyl phosphate, and allyl isocyanurate, along with any combinations thereof.

In an embodiment, the monofunctional (meth)acrylate compound incudes or consists of monofunctional urethane (meth)acrylate compounds. In another embodiment, the monofunctional (meth)acrylate compound comprises non-urethane (meth)acrylate compounds, such as isopropylideneglycerol (meth)acrylate (IPGMA or IPGA), hydroxyethyl(meth)acrylate (HEMA or HEA), 2-hydroxypropyl (meth)acrylate (HPMA or HPA), benzyl (meth)acrylate (BMA or BA), cyclohexyl (meth)acrylate, isobornyl (meth) acrylate, or 4-tbutylcyclohexyl (meth)acrylate, or mixtures thereof.

In a preferred embodiment, the monofunctional (meth) acrylate compounds include, consist essentially of, or consist of benzyl methacrylate, 2-hydroxypropyl methacrylate, isopropylideneglycerol methacrylate, glycerol formal methacrylate, lauryl methacrylate, a (meth)acrylate-functional compound that contains the residue of a polypropylene oxide, or tetrahydrofurfuryl methacrylate, or combinations thereof.

One or more of the aforementioned monofunctional (meth)acrylate compounds can be employed in compositions according to the present invention in any suitable amount in order to tune the viscosity of the formulation with which they are associated to be suitable for the additive fabrication process to be used therewith according to methods well-known in the art to which this invention applies. Such compounds may be chosen singly or in combination of one or more of the types enumerated herein. In an embodiment, the monofunctional (meth)acrylate compound is present in an amount, relative to the entire weight of the entire composition or kit of materials, from about 1 to 50 wt %, or from 1 to 40 wt. %, or from 1 to 25 wt. %, or from 10 to 50 wt. %, or from 10 to 40 wt. %, or from 10 to 25 wt. %.

Initiators

Compositions according to the first aspect of the present invention further comprise an initiator component. As used herein and unless otherwise designated, “initiator component” is meant to include any and all different initiators present in a given composition or kit of materials. Compositions of the first aspect may possess any number of different initiators as prescribed elsewhere herein.

Initiators are substances which initiate, enable, facilitate, or catalyze chemical reactions that result in or improve the rate or amount of reaction or polymerization in a given composition when it is subjected to appropriate amounts of an external stimulus. If the initiator is predominantly able to be activated via thermal energy, it is designated as a thermal initiator. If an initiator is predominantly able to be activated via application of actinic radiation, it is known as a photoinitiator. More specifically, a photoinitiator is a compound that undergoes a photoreaction upon absorption of actinic radiation (particularly in the visible and/or UV spectral region), whereupon reactive species are created. These reactive species are capable of catalyzing, initializing, or carrying out chemical reactions that result in significant changes in the physical properties of suitable formulations. Hence, the photoinitiator is a compound that can transform the physical energy of light into suitable chemical energy in the form of reactive intermediates. Common types of photoinitiators include cationic photoinitiators and free-radical photoinitiators.

As used in the compositions of the first aspect of the invention, the photoinitiators serve to initiate the reactivity or polymerization of the urethane (meth)acrylate compound, the multifunctional (meth)acrylate compound, and/or the monofunctional (meth)acrylate compound as elsewhere described herein. In an embodiment, photoinitiator initiates polymerization in response to UV light, visible light, or both UV light and visible light. In an embodiment, the photoinitiator initiates polymerization at a wavelength of from 300 to 470 nm, or from 300 to 395 nm, or from 325 to 365 nm, or from 345 to 430 nm.

In a preferred embodiment, the photoinitiators comprise a free-radical photoinitiator. In an embodiment, the free-radical photo-initiator is selected from the group consisting of benzoyl phosphine oxides, aryl ketones, benzophenones, hydroxylated ketones, 1-hydroxyphenyl ketones, ketals, metallocenes, and any combination thereof.

In an embodiment, the free-radical photo-initiator may be 2,4,6-trimethylbenzoyl diphenylphosphine oxide, 2,4,6-trimethylbenzoyl phenyl, ethoxy phosphine oxide, bis(2,4,6-trimethylbenzoyl)-phenylphosphineoxide, 2-methyl-1-[4-(methylthio)phenyl]-2-morpholinopropanone-1,2-benzyl-2-(dimethylamino)-1-[4-(4-morpholinyl) phenyl]-1-butanone, 2-dimethylamino-2-(4-methyl-benzyl)-1-(4-morpholin-4-yl-phenyl)-butan-1-one, 4-benzoyl-4'-methyl diphenyl sulphide, 4,4'-bis(diethylamino) benzophenone, and 4,4'-bis(N,N'-dimethylamino) benzophenone (Michler’s ketone), benzophenone, 4-methyl benzophenone, 2,4,6-trimethyl benzophenone, dimethoxybenzophenone, l-hydroxycyclohexyl phenyl ketone, phenyl (1-hydroxyisopropyl)ketone, 2-hydroxy-1-[4-(2-hydroxyethoxy) phenyl]-2-methyl-1-propanone, 4-isopropylphenyl(1-hydroxyisopropyl)ketone, oligo-[2-hydroxy-2-methyl-1-[4-(1-methylvinyl)phenyl] propanone], camphorquinone, 4,4'-bis(diethylamino) benzophenone, benzil dimethyl ketal, or bis(eta 5-2-4-cyclopentadien-1-yl) bis[2,6-difluoro-3-(1H-pyrrol-1-yl) phenyl] titanium, or any combination thereof.

Further free-radical photo-initiators include: benzoylphosphine oxides, such as, for example, 2,4,6-trimethylbenzoyl diphenylphosphine oxide (Lucirin TPO from BASF) and 2,4,6-trimethylbenzoyl phenyl, ethoxy phosphine oxide (Lucirin TPO-L from BASF), bis(2,4,6 -trimethylbenzoyl)-phenylphosphineoxide (Irgacure 819 or BAPO from Ciba), 2-methyl-1-[4-(methylthio)phenyl]-2-morpholinopropanone-1 (Irgacure 907 from Ciba), 2-benzyl-2-(dimethylamino)-1-[4-(4-morpholinyl) phenyl]-1-butanone (Irgacure 369 from Ciba), 2-dimethylamino-2-(4-methyl-benzyl)-1-(4-morpholin-4-yl-phenyl)-butan-1-one (Irgacure 379 from Ciba), 4-benzoyl-4'-methyl diphenyl sulphide (Chivacure BMS from Chitec), 4,4'-bis(diethylamino) benzophenone (Chivacure EMK from Chitec), 4,4'-bis(N,N'-dimethylamino) benzophenone (Michler's ketone), camphorquinone, 4,4'-bis(diethylamino) benzophenone (Chivacure EMK from Chitec), 4,4'-bis(N,N'-dimethylamino) benzophenone (Michler's ketone), bis(2,4,6-trimethylbenzoyl)-phenylphosphineoxide (Irgacure 819 or BAPO from Ciba), and metallocenes such as bis (eta 5-2-4-cyclopentadien-1-yl) bis [2,6-difluoro-3-(1H-pyrrol-1-yl) phenyl] titanium (Irgacure 784 from Ciba), or a mixture thereof.

In an embodiment, the composition may include a thermal initiator. In a preferred embodiment, the thermal initiator comprises, consists of, or consists essentially of thermal free-radical polymerization initiators. Examples of thermal free-radical polymerization initiators include, but are not limited to, azo compounds such as, for example, azo isobutyronitrile (AIBN), 1,1'-azobis(cyclohexanenitrile), 1,1'-azobis(2,4,4-trimethylpentane), C—C labile compounds, such as benzopinacole, peroxides, and mixtures thereof.

In an embodiment, the thermal initiator comprises a peroxide. Possibly suitable peroxides include organic and inorganic peroxides. In an embodiment, the thermal initiator is soluble in the composition.

Examples of peroxides include for example, percarbonates (of the formula —OC(O)O—), peroxy esters (of the formula —C(O)OO—), diacylperoxides, also known as peranhydride (of the formula —C(O)OOC(O)—), dialkylperoxides or perethers (of the formula —OO—), hydroperoxides (of the formula —OOH), etc. The peroxides may also be oligomeric or polymeric in nature.

The thermal free-radical polymerization initiator may for example comprise a percarbonate, a perester or a peranhydride. Peranhydrides are for example benzoylperoxide (BPO) and lauroyl peroxide (commercially available as Laurox™). Peresters are for instance t-butyl per benzoate and 2-ethylhexyl perlaurate. Percarbonates are for example di-t-butylpercarbonate and di-2-ethylhexylpercarbonate or monopercarbonates.

The initiator component according to various embodiments of the first aspect may comprise, consist essentially of, or consist of photoinitiators; in other embodiments the initiator may comprise, consist essentially of, or consist of thermal initiators. In yet further embodiments the initiator component may include both one or more photoinitiators and one or more thermal initiators.

If used, in an embodiment, the one or more initiators are present in an amount of at least wt. %, at least 0.05 wt. %, at least 0.1 wt. %, at least 0.2 wt. %, at least 0.3 wt. %, at least 0.4 wt. %, at least 0.5 wt. %, at least 1.0 wt. %, at least 1.5 wt. %, at least 2 wt. %, or at least 2.5 wt. %, based on the total weight of the composition or kit of materials. In an embodiment, the one or more initiators are present in an amount of at most 10 wt. %, at most 8 wt. %, at most 7 wt. %, at most 6 wt. %, at most 5 wt. %, or at most 4 wt. %, based on the total weight of the composition or kit of materials.

Additives

The composition may optionally further include one or more additives. Possible additives include stabilizers, dyes, pigments, antioxidants, wetting agents, photosensitizers, chain transfer agents, leveling agents, defoamers, surfactants and the like.

The compositions according to the first aspect can further include one or more additives selected from the group consisting of bubble breakers, antioxidants, surfactants, acid scavengers, thickeners, flame retardants, silane coupling agents, ultraviolet absorbers, resin particles, core-shell particle impact modifiers, soluble polymers and block polymers.

Stabilizers are often added to the resin compositions in order to further prevent a viscosity build-up, for instance a viscosity build-up during usage in a solid imaging process In the instant claimed invention, the presence of a stabilizer is optional.

In an embodiment, the composition contains a filler. Examples of fillers include both organic and inorganic particulate fillers. The filler may possess a surface functionality or not, the surface functionality comprising a polymerization group that is capable of (co)polymerization with one or more of the compounds of the reactive component. The filler may comprise organic or inorganic particles of micron size or less, such as nano-particles. Examples include core-shell particles, inorganic particles, pigments, or plasticizers. In an embodiment, the particulate filler comprises an inorganic filler, such as $SiO_2$, $AlO_2$, $TiO_2$, $ZnO_2$, $SnO_2$, Am—$SnO_2$, $ZrO_2$, Sb—$SnO_2$, $Al_2O_3$, or carbon black. Inorganic fillers for use in liquid radiation curable compositions for additive fabrication, especially silica-based fillers, are described in, i.a, U.S. Pat. Nos. 9,228,073, 9,951,198, and U.S. Ser. No. 10/526,469.

In an embodiment, the particulate filler comprises an organic filler, such as polyurethane particles, polystyrene particles, poly(methyl methacrylate) particles, or polycarbonate particles.

If present, the additives may be included in any suitable amount, such as from 1 to 40 wt. %, relative to the weight of the entire composition. In an embodiment, the composition includes additives further comprising one or more fillers. In an embodiment, the fillers comprise an impact modifier. In an embodiment, the impact modifier comprises core-shell particles.

Compositions according to the first aspect of the present invention may be provided as a singular mixture, or the individual components described above herein may be provided as a kit comprising separate containers or enclosures of the compositional elements described. Such kits may be provided in various breakdowns depending on the nature of the additive manufacturing process into which the composition(s) are to be utilized. Some multi-part systems will mix various compositional elements together just prior to jetting, extrusion, or curing. This may be done to enhance stability and to prevent the unwanted reaction of various constituent elements prior to the build process, such as the undesired reaction of a photoinitiator by virtue of ambient or unintended light exposure. In such case, it will be appreciated by those of ordinary skill in the art to which this invention applies that the quantities of materials defined herein will be applicable in the composition at the time such composition is actually cured.

A second aspect of the invention is a radiation curable composition for additive fabrication comprising, consisting of, or consisting essentially of, relative to the entire weight of the composition:

a. from 40 to 95 wt. %, based on the total weight of the composition, of a (i) urethane (meth)acrylate oligomer having at least one polymerizable group, wherein the urethane (meth)acrylate oligomer is the reaction product of a diisocyanate, a polyether polyol, and a hydroxy-functional (meth)acrylate;

b. from 0 to less than 40 wt. % of (ii) a monofunctional reactive diluent monomer;

c. greater than 20 wt. % of (iii) one or more methacrylate-functional compounds comprising a number average of greater than 1.5 polymerizable groups;

wherein at least one of the polymerizable groups of the compound according to (iii) is (co)polymerizable with the at least one polymerizable group of the oligomer according to (i) and/or (ii); and wherein the compound according to (iii) possesses a number average molecular weight (Mn) value that is less than the Mn value of the oligomer according to (i) and greater than the Mn of the monomer according to (ii);

wherein Mn is measured by size exclusion chromatography (SEC) method.

Compositions according to the second aspect may incorporate many of the aforementioned urethane (meth)acrylate compounds, multifunctional (meth)acrylate compounds, monofunctional (meth)acrylate compounds, and initiators described above as appropriate with respect to the first aspect of the invention, supra. Specifically component (a) of the second aspect may incorporate any oligomeric versions of the urethane (meth)acrylate compounds described above with respect to the first aspect. Next, component (b) may incorporate reactive diluent monomeric versions of the monofunctional (meth)acrylate compounds described above with respect to the first aspect. Similarly, component (c) may incorporate methacrylate-functional versions of the multi-functional (meth)acrylate compounds described above with respect to the first aspect as appropriate, with the proviso that some monofunctional monomers may be therein included such that the net number average of polymerizable groups in component (c) is greater than 1.5.

In an embodiment, component (a) comprises, consists of, or consists essentially of urethane (meth)acrylate oligomers possessing an Mn value from 750 to 10000 g/mol, or 1000 to 7000 g/mol, or 1000 to 6000 g/mol, or 1000 to 5000 g/mol, or 1000 to 4000 g/mol, or 2000 to 8000 g/mol, or 2000 to 7000 g/mol, or 2000 to 6000 g/mol, or 2000 to 5000 g/mol, or 2000 to 4000 g/mol, or 3000 to 8000 g/mol, or 3000 to 7000 g/mol, or 3000 to 6000 g/mol, or 3000 to 5000 g/mol, or 4000 to 8000 g/mol, or 4000 to 7000 g/mol, or 750 to 6000 g/mol; preferably from 750 to 4000 g/mol. Preferably, Mn values are determined by an SEC method, and in particular those described elsewhere herein, supra, with respect to the first aspect of the invention.

Compositions according to the invention may also be configured to possess certain equivalents of acrylate and/or (meth)acrylate groups. Methods for determining equivalents of various moieties, including (meth)acrylate groups, are well-known in the art to which this invention applies. As reported herein, (meth)acrylate equivalents values may be determined by summing the molar amounts for each relevant (meth)acrylate group-containing compositional constituent, wherein values for each constituent are determined according to the following formula:

$$\frac{f * wt.\ \%}{Mn,\ theo},$$

in which f represents the number of relevant desired (meth) acrylate groups per molecule of a given compositional constituent, wt. % is the weight percentage of the relevant desired (meth)acrylate group-containing constituent relative to the total formulation, and Mn, theo is the theoretical molecular weight of the specific compositional constituent into which such (meth)acrylate group is incorporated.

In an embodiment, the composition contains from 0 to 0.1, or from 0.01 to 0.08, or from to 0.065, or from 0.03 to 0.055 equivalents of acrylate groups. In an embodiment, the composition contains from 0.2 to 0.3, or from 0.22 to 0.27, or from 0.20 to 0.33 equivalents of methacrylate groups.

A third aspect of the invention is a method of producing a three-dimensional part via an additive fabrication process, the method comprising:

a. providing a first layer of a radiation curable composition, thereby forming a first surface;

b. optionally, heating at least a portion of the first layer of the radiation curable composition;

c. exposing at least a portion of the first layer of the radiation curable composition imagewise to actinic radiation to form a cured cross-section;

d. providing an additional layer of a radiation curable composition onto at least a portion of the cured cross-section to form an additional layer of the radiation curable composition;

e. exposing at least a portion of the additional layer of the radiation curable composition imagewise to actinic radiation to form an additional cured cross-section;

f. repeating steps (d) and (e) a plurality of times in order to form a three-dimensional object which is the cured product of the radiation curable composition;

wherein the radiation curable composition is defined by any of the compositions according to any of the embodiments of the first aspect or the second aspect of the invention.

Layers of radiation curable compositions may be provided in a number of ways, as will be appreciated by those of skill in the art to which this invention applies. The layer may be of any suitable thickness and shape and is dependent on the additive fabrication process utilized. In a stereolithography process, for example, a vat of liquid resin lies in a vat. The first layer is set and controlled by a vertically-moveable platform which raises or lowers (dips) the liquid level in the vat, along with the intensity, orientation, and focus of a laser which cures to a specified depth below the surface of the liquid resin. Such layers will typically be substantially of a uniform thickness in stereolithography processes. In similar DLP-based processes, instead of a layer determined by a laser depth, the radiation is imparted image-wise in a mask-based pattern, typically by light collimated by a multitude of LED sources. Alternatively, layers may be selectively deposited on a substrate or previous cured layer, as is performed in known jetting processes. The substrate may be a planar build plate or platform, or it may be a powderized bed of particulate resin, for example. Layers may further be provided in a rolling or extrusion process, and may be transported on a moveable foil (the term understood herein to include both polymeric and metal substrates), film, or carrier.

The radiation curable composition provided may be any of those described according to the first or second aspects of the present invention. However, in a preferred embodiment according to the third aspect, the radiation curable composition comprises, relative to the weight of the entire composition, one or more urethane (meth)acrylate oligomers, wherein a linear polymer formed by said one or more urethane (meth)acrylate oligomers possesses a glass transition temperature (Tg), wherein said Tg is determined by ISO 11357-2. The Tg of the linear polymer formed from the (meth)acrylate oligomer may be chosen to be any suitable value, depending upon the desired characteristics of the cured articles for a particular end-use application. In an embodiment, however, the Tg of a linear polymer formed from the urethane (meth)acrylate oligomer is between −30 to +20° C. In an alternative embodiment, the average Tg of all urethane (meth)acrylate oligomers used in the radiation curable composition is between −80 to −30° C.

The exposing step may occur via any suitable means, including those commonly employed in additive fabrication processes involving the photopolymerization of thermoset materials. Such exposure may be provided via lasers, LED lamps, or any other conventional means.

In the above, "exposing" refers to irradiating with actinic radiation. In an embodiment, the exposing optics utilize one or more LEDs as a light source. In an embodiment, the light source is a laser. In an embodiment, the LED or laser light source is coupled to a DLP or LCD image projection system. In an embodiment wherein the image projection systems includes an LCD display, the light source may be configured to emit actinic radiation exclusively above 400 nm, to minimize the detrimental effect UV wavelengths have upon LCD componentry.

The aforementioned steps are repeated a plurality of times as needed to create layers sufficient to establish the final geometry of the article desired to be formed.

A fourth aspect of the current invention an article or object cured from the composition according to any of the embodiments according to the first or second aspects of the invention, and/or via the processes described in any of the embodiments according to the third aspect of the invention.

The following examples further illustrate the invention but, of course, should not be construed as in any way limiting its scope.

EXAMPLES

These examples illustrate embodiments of the radiation curable compositions for additive fabrication of the instant invention. Table 1 describes the various components of the radiation curable compositions for additive fabrication used in the present examples. Tables 2A and 2B, meanwhile, describe the various sub-components used to synthesize the oligomers referred to in Table 1 and used in the present examples. Table 3 lists the compositional make-up of each of the formulations evaluated herein. Finally, Tables 4A, 4B, and 4C describe various performance characteristics of one or more of the formulations used herein.

TABLE 1

| Component | Chemical Descriptor | Supplier |
|---|---|---|
| AgiSyn DG-0022 ("DG-0022") | Difunctional urethane methacrylate oligomer; Mn = 1632.8 Da (design) Mn = 2200 Da, PDI = 1.2 (GPC, Polystyrene Standard) | DSM |
| AgiSyn DG-0090B ("DG-0090B") | Difunctional urethane methacrylate oligomer; Mn = 1512.8 Da (design), Mn = 2438, PDI = 1.3 (GPC, Polystyrene Standard) | DSM |
| AgiSyn U20 ("U20") | Difunctional Urethane acrylate oligomer; Mn = Mn = 1172.8 Da (design) | DSM |
| Genomer G4247 ("UDMA") | Mixture of isomers of diurethane dimethacrylate; CAS # 72869-86-4 | Rahn AG |
| GEO Bisomer HPMA ("HPMA") | 2-Hydroxypropyl methacrylate; CAS # 27813-02-1 | Geo Specialty Chemicals |
| GEO Bisomer BZMA | Benzyl methacrylate; CAS # 2495-37-6 | Geo Specialty Chemicals |
| GEO Bisomer LMA | Lauryl methacrylate; CAS # 142-90-5 | Geo Specialty Chemicals |
| TPO | Diphenyl (2,4,6-trimethylbenzoyl)phosphine oxide; CAS # 75980-60-8 | IGM |
| Byk 1790 | Proprietary Tripolymer | BYK |

TABLE 2A

| oligomer reactants | | |
|---|---|---|
| Component | Chemical Descriptor | Supplier |
| IPDI | Isophorone diisocyanate; CAS # 4098-71-9 | Evonik |
| TDI | Toluenediisocyanate; CAS 584-84-9 | Covestro |
| CAPA 2054 | Polycaprolactone (Mw = 540) diol | Perstorp |
| PPG1000 | Polypropylene Glycol (Mw = 1000) diol | BASF |
| PPG400 | Polypropylene Glycol (Mw = 400) diol | Covestro |
| TIB 716 | Bismuth-based liquid catalyst | TIB Chemicals |
| BHT | Butylated hydroxytoluene; CAS # 000128-37-0 | Lanxess |
| HEA | hydroxy ethyl acrylate; CAS # 818-61-1 | Nippon Shokubai |

TABLE 2B oligomer reactants
Amounts listed in terms of equivalents unless otherwise noted

| | Oligomer | | |
|---|---|---|---|
| Component | DG-0090B | DG-0022 | U20 |
| IPDI | 0 | 0 | 4 |
| TDI-80 | 23.6 | 21.25 | |
| CAPA 2054 | 0 | 0 | 2 |
| PPG1000 | 54.8 | 64.43 | |
| PPG400 | 5.79 | 0 | |
| BHT | 0.05 | 0.104 | |
| HEA | 15.73 | 14.17 | 2 |
| TIB 716 | 0 | 0 | 0.03 wt. % |
| DBTDL | 0.03 | 0.05 | 0.08 wt. % |

Synthesis of Oligomers

The oligomers used in the examples described below were synthesized according to the following protocols:

Oligomer DG-0090B

For this outside-in synthesis, the following synthesis steps were used. First, the diisocyanate (TDI-80) and BHT was charged into a 250 ml reactor (equipped with a stirrer, air inlet, dropping funnel, and condenser). After charging, the reactor was heated to 30° C. before the reactor was purged with dry lean air. Then the specified amount of an acrylate endcap (HEA) added in 10% aliquots every 6 minutes. Temperature was maintained under 70° C. After addition of HEA, the temperature was raised to 70° C. The 70° C. temperature was then further maintained under continuous stirring for 1 hour. After 1 hour, the quantity of isocyanate (NCO) content was measured by a potentiometric titrator to ensure it was within 10% of the value of the theoretical isocyanate content that would be derivable for the oligomer from the quantities specified in Table 2B above. Upon confirmation of the appropriate isocyanate content, the appropriate amount of polyol (PPG1000) was added to the oligomer. The resulting mixture was reacted for 15 minutes at 70° C. PPG400 was added and the resulting mixture was stirred for 15 minutes at 70° C. Exotherm was monitored throughout and maintained below 80° C. DBTL catalyst was added to reaction. Temperature was increased to 80° C. and maintained for 2 hours under continuous stir. After 2 hours, the NCO content was checked via potentiometric titration again. Once the isocyanate content was lower than 0.1% relative to the entire weight of the composition the reaction was considered finished. The temperature was reduced to 60° C. Viscosity was measured as a quality check and verified to be 294,900 mPa·s+/−5000 mPa·s (Z3 cup, 50 sec.-1, 25° C.). Finally, the resulting synthesized oligomer was cooled slowly and discharged for use in the experiments described elsewhere herein.

Oligomer DG-0022

For this outside-in synthesis, the following synthesis steps were used. First, the diisocyanate (TDI-80) and BHT was charged into a 250 ml reactor (equipped with a stirrer, air inlet, dropping funnel, and condenser). After charging, the reactor was heated to 30° C. before the reactor was purged with dry lean air. Then the specified amount of an acrylate endcap (HEA) added in 20% aliquots every 6 minutes. Temperature was maintained under 60° C. After addition of HEA, the temperature was raised to 60° C. and held for 1 hour under continuous stirring. DBTDL was charged and reaction was held for 30 minutes. After 1 hour, the quantity of isocyanate (NCO) content was measured by a potentiometric titrator to ensure it was within 10% of the value of the theoretical isocyanate content that would be derivable for the oligomer from the quantities specified in Table 2B above. Upon confirmation of the appropriate isocyanate content, the reaction was heated to 70° C. The appropriate amount of polyol (PPG1000) was charged. The resulting mixture was stirred for 1 hour at 70° C. Exotherm was monitored throughout and maintained below 90° C. After 1 hour, the NCO content was checked via potentiometric titration again. Once the isocyanate content was lower than 0.1% relative to the entire weight of the composition the reaction was considered finished. The temperature was reduced to 60° C. Viscosity was measured as a quality check and verified to be between 145000 and 215000 mPa·s (Z3 cup, 50 sec.-1, 25° C.). Finally, the resulting synthesized oligomer was cooled slowly and discharged for use in the experiments described elsewhere herein.

Oligomer U20

For this outside-in synthesis, the following synthesis steps were used. First, the diisocyanate (IPDI) was charged into a 250 ml reactor (equipped with a stirrer, air inlet, dropping funnel, and condenser). After charging, the reactor was heated to 45° C. before the reactor was purged with dry lean air. Then the specified amount of an acrylate endcap (HEA) with the appropriate amount of BHT, was charged into the reactor whilst stirring. After this step the corresponding quantity of TIB 716 was added into the reactor. After 1 hour, the temperature was raised to 60° C. The 60° C. temperature was then further maintained for 2 additional hours. After these 2 hours reaction, the quantity of isocyanate (NCO) content was measured by a potentiometric titrator to ensure it was within 10% of the value of the theoretical isocyanate content that would be derivable for the oligomer from the quantities specified in Table 2B above. Upon confirmation of the appropriate isocyanate content, the appropriate amount of polyol (CAPA 2054) was added to the oligomer. Next, the temperature was raised to 85° C. The resulting mixture was reacted for 1 hour at 85° C. After this 1-hour reaction, the NCO content was checked via potentiometric titration again. Once the isocyanate content was lower than 0.1% relative to the entire weight of the composition the reaction was considered finished. Finally, the resulting synthesized oligomer was cooled slowly and discharged for use in the experiments described elsewhere herein.

Formulations 1-3

Various examples were then formulated by using combinations of the formulation constituents described above and listed in Table 1. Such formulations were prepared in 100 g increments utilizing a protocol which began by heating the relevant specified oligomer overnight to a temperature of between 55-60° C. Then the oligomer was added to a 100 g FlackTek mixing container. With the addition of the oligomer complete, the remainder of the formulation ingredients were then added individually to the mixing container in the amounts specified per individual example as prescribed in Table 3 below. The order of addition of the remaining formulation ingredients is not thought to have any appreciable effect on the final formulation properties or behavior. With all prescribed components added, the entire formulation present in the mixing container was moved to an oven which had been pre-heated to 60° C. The jar remained in said oven for a period of between two to three hours, after which the mixing container was removed from the oven. Immediately after removal, the contents were stirred by hand. Mixing continued until it was visibly apparent that the materials had been thoroughly mixed, in accordance with knowledge well within the person of ordinary skill in the art to which this invention applies. Next, the mixing container was allowed to cool at room temperature for two additional hours. After this cooling period, the mixing jar was placed in a FlackTek SpeedMixer™ which was then set to 2800 revolutions per minute. The mixer was allowed to operate at this rotational velocity for one minute, after which the mixing container was removed. Finally, the formulation was hand-stirred with a spatula for at least 1 additional minute to assure appropriate mixing of all formulation components. The final formulation was transferred into an opaque metal canister. The specific contents and proportion of constituents of each of the examples is specified below in Table 3.

TABLE 3

Formulations 1-3. Amounts listed in parts by weight.

| | 1 | 2 | 3 (Comparative) |
|---|---|---|---|
| DG-0022 | | | 48 |
| U20 | 50 | 0 | |
| DG-0090B | 0 | 50 | |
| UDMA | 20 | 20 | 25 |
| BZMA | 14 | 22 | 16.7 |
| LMA | 14 | 6 | |
| HPMA | | | 8 |
| TPO | 2 | 2 | 2.2 |
| BYK 1790 | | | 0.1 |

Next, the formulations 1-3 were each evaluated to determine certain cure speed characteristics and glass transition behavior per the methodology described below. The results of these evaluations are presented in Table 4A. Then, each of formulation 1, 2, and 3 was evaluated to assess the tensile behavior of controlled three-dimensional objects cured therefrom per the methodology described further below. The results of this evaluation are reproduced in summary in Tables 4A, 4B, and 4C.

Working Curve Measurements and Printability Determination

Under Origin Machine Settings, the light intensity score was also set to "320" for an overall exposure intensity of 5.2 mW/cm$^2$. This exposure intensity was determined by creating a curve created in conjunction with several additional actions. Such actions included a removal of the build platform and the use of Origin Machine software to set the light intensity score (200-800 at 50 interval). Additionally, a PD300 sensor (Ophir) was placed at the bottom of the resin vat in accordance with the sensor manufacturer's guidelines. Next, the build was started, and the light intensity measured through a radiometer. Finally, a calibration plot was created. The total exposure time for each of the 6 strips was prescribed as follows:

The light intensity of a 385 nm DLP 3D Printer at various energy settings was determined using an Ophir Nova I light meter with 385 nm detector. To determine working curves, a portion of the liquid resin corresponding to each formulation (as described in Table 3A above) was placed on a 0.1 mm thick mylar sheet and placed on top of the enclosed light engine housing in a 385 nm DLP 3D printer.

In order to create test strips to be used in the subsequently described FTIR and DMTA tests, cured products from the relevant formulation were created in an Origin 385 nanometer DLP printer having a build envelope of 144 mm×81 mm×320 mm. Unless otherwise specified, 6 strips of each sample were assembled in center using Netfabb® additive manufacturing software from Autodesk. The strips were dosed with increasing amounts of light: 1 s, 1.5 s, 2 s, 3 s, 4 s, 5 s, respectively. Excess of liquid resin was removed. Thicknesses of wedges were measured by a Mitutoyo absolute digimatic indicator (model ID-C112CE) for calculation of predicted E10.

Next, the data collected for each formulation was analyzed. The working curve was modeled using the equation below:

$$C_d = D_p * \ln\left(\frac{E_{Max}}{E_c}\right)$$

In this equation, $C_d$ is "cure depth", in mils. This semilog plot of $C_d$ vs $E_{Max}$ is a straight line, called a "working curve", where the slope and intercept are penetration depth and Ec (critical exposure), respectively. On this plot, the coordinates at each point can be described as <D, $E_d$>, in mils and millijoules per square centimeter, respectively. $E_d$ translates into the energy required to cure resin into a layer "d" mm thick. Finally, the parameter $E_{10}$ from a working curve plot was determined and recorded using linear regression of real data from experimentation on the SLA system used. All experiments were conducted 2-3 times to ensure consistency. The E10 values for each formulation were recorded and are presented in Table 4A below under the column headed by the designation $E_{10}$. Units are provided in terms of millijoules per square centimeter.

For all working curve experiments described in Table 4A below, "fast printing" for bottom-up DLP was determined to have a threshold at $E_{10} \leq 30$ mJ/cm$^2$. This threshold was determined through general knowledge of competitor resins and what is considered a "normal" DLP resin speed, as well as concerns regarding decomposition of the resin due to excessive energy input.

TABLE 4A

Exposure Test and Glass Transition Behavior

| Exposure Property | 1 | 2 | 3 (Comparative) |
|---|---|---|---|
| $E_c\left(\frac{mJ}{cm^2}\right)$ | 3.90 | 3.95 | 4.85 |
| $D_p$ (mm) | 0.14 | 16 | 0.160 |
| $E_{10}\left(\frac{mJ}{cm^2}\right)$ | 22.3 | 18.5 | 22 |
| E" breadth<br>Tan Delta | +10C to 40C<br>+65C | −20C to +25C<br>+58C | −10C to +30C<br>+62C |

Test Strip Creation Using DLP Working Curve Method

Each of the 6 strips were programmed in Netfabb to possess a length of 40 mm and a width of 6.35 mm. Meanwhile, each of the 6 successive strips was programmed in Netfabb to possess a height input from 0.1 to 0.6 mm in 0.1 successive increments for each strip. The height on Netfabb was inputted purely to control the number of layers in exposure, and not to designate an intended height of the final fabricated structure.

Next, in addition to a resolution setting of 0.1 mm/layer and a setting of 2 burn-in layers after the initial layer, the following additional resin settings were created using Origin software controls:

| Parameter | Layer 1 | 2 | 3 | 4 | 5 | 6 |
|---|---|---|---|---|---|---|
| Exposure Delay | 3 sec | 0 sec | 0 sec | 0 sec | 0 sec | 0 sec |
| Exposure Duration | 1 sec | 0.5 sec | 0.5 sec | 1 sec | 1 sec | 1 sec |
| Separation Distance | 0 sec | 0 sec | 0 sec | 0 sec | 0 sec | 0 sec |
| Total Exposure Time: | 1 sec | 1.5 sec | 2.0 sec | 3.0 sec | 4.0 sec | 5.0 sec |

In order to run the experiment, several further guidelines were followed:

Remove build platform and vat from Origin machine

Cover projecting glass with single sheet of white printer paper. Trace edges of projecting glass onto printer paper using a pencil.

Run build and resin sequence on machine. Total sequence should take about 30 seconds. The pattern projection of the six strips should be easily observed.

Draw boundary box around all six strips onto white paper. Run build+resin sequence multiple times if necessary to ensure that boundary box is accurate.

Position petri dish lid (0.835 mm thickness)

The results were recorded and samples with thickness closest to 0.35 mm were picked for subsequent DMTA analysis.

Dynamic Mechanical Analysis

DMTA testing was then used to determine further mechanical properties of the cured product produced from select formulations. The machine used for this process was a TA Instruments RSA 3. The software used was TA Orchestrator 8500-0114 (Firmware RSA 1.06.00).

Samples selected from DLP working curve experiments which closely match a desired strip thickness of 0.325 mm were used for all experiments. After gap check, the instrument clamps were set at a distance of 20.00 mm apart. The sample width was measured, and the sample was inserted between the clamps. The machine was set with a pre-tension between 20 and 50 Newtons. All measurements were input. The DMTA experiments were run from an initial temperature of to 120° C. or from −20° C. to 80° C. at a ramp rate of 3° C./min and at a frequency of 6.2832 rad/s. A 30 second soak time was set after ramp. One data point was collected every 30 seconds. Strain was maintained at 0.05%.

The maxima of tan δ (expressed as a dimensionless ratio of E"/E' unless otherwise noted) and/or maxima of E" (expressed in ° C. unless otherwise noted) were both measured. E" values, which may be used to approximate the glass transition temperature of the specified material, were recorded and are reproduced in Table 4B below under the heading "E"."

Tensile Testing

Next, tensile testing was conducted with respect to cured products created from several of the formulations utilized. All tensile testing was performed using an MTS Criterion Model 43. The software used to analyze and extract data was a TW Elite, version 4.2.3.746. All experiments were performed as static plastic tensile tests, without an extensiometer, using a 50 kN load cell. Each set of experiments were performed using 5-7 tensile specimens, fabricated identically.

Inputs into the machine were as follows: Gage length for all samples was kept constant at 50 mm, consistent with the gage length for a typical ASTM Type I Tensile Bar. Tensile elongation rate was kept constant at 0.1 mm/s. Temperature was maintained between 22° C. and 23° C., with a relative humidity recorded between 54% and 55% for all experiments. Temperature and humidity were read using Jumbo Temperature Humidity Meter (from Traceable). The span width and thickness were measured at the center of each specimen using a Mitutoyo Absolute Digimatic Metal Caliper and input into the software.

ASTM Type I Tensile bars were used for all tensile testing measurements reported in Table 4B herein.

For formulations under the column heading "Print Method" designated as "DLP", 3 mm thick ASTM Type I tensile bars were printed on an Origin DLP machine.

For each formulation where specified, a total of thirty (30) ASTM I tensile bars per build were staged on the Origin DLP machine using Netfabb software. Each 100 micron layer was exposed to 385 nm light at 5.2 mW/cm 2 for between 2.2 and 3.5 seconds. The machine was operated in accordance with manufacturer guidelines. 3D printed parts were removed by leveraging a blade underneath each tensile bar and peeling the tensile bars off the platform.

Then, prior to mechanical analysis, all tensile bars were post-processed according to the following method:

A clean 1 L Nalgene bottle was filled with 99.7% isopropyl alcohol (IPA) such that the mass ratio of IPA to printed part was 40:1. 3D printed parts were added to the Nalgene bottle, and the bottle was continuously agitated for 5 minutes. Parts were then removed, rinsed with IPA, and dried by hand towel.

Parts were arranged on a clean glass platform. The platforms were placed in a 3D Systems PCA oven with ten 40 Watt and 0.88 Ampere long fluorescent bulbs arranged five to a side, with broad wavelength (see below [179]) for 30 minutes. The parts were then flipped and cured for another 30 minutes. The platforms, still carrying the parts after UV postcure, were placed in a thermal oven set at 100° C. for 1 hour. Parts were removed, inserted into a labeled open-faced bag, and placed in a controlled environment at 22-23° C. and 54-55% relative humidity for 24-48 hours.

With the parts appropriately post-processed, evaluation of Tensile Modulus, Yield Stress, Elongation at Yield, Elongation at Break, and Break Stress was then conducted. The determination of each sample's Tensile Modulus, Yield Stress, Elongation at Yield, and Elongation at Break was performed in accordance with ASTM D638 for the ASTM Type I specimens at strain rates of 5 mm/min, 50 mm/min, and 500 mm/min. Tensile modulus (reported in Table 4B under the column headed by "Modulus"), Yield Stress, and Break Stress are reported in units of Megapascals (MPa), rounded to the nearest tenth's place, unless otherwise noted. Elongation at Yield and Elongation at Break (reported in Table 4B under the columns headed by "EAY" and "EAB," respectively) are unitless, but represent measurements taken on a mm/mm basis.

The results were recorded and are reproduced in relevant part in Table 4B below.

TABLE 4B

Tensile Behavior, Formulation 1

| Property | UV + Thermal or Fusion Line, 5 mm/min | | UV + Thermal or Fusion Line, 50 mm/min | | UV + Thermal or Fusion Line, 500 mm/min | | | |
|---|---|---|---|---|---|---|---|---|
| | Value | STDEV | Value | STDEV | Value | STDEV | Units | Method |
| Tensile Modulus | 994 | 34 | 1288 | 39 | 1330 | 40 | MPa | D638M |
| Tensile Elongation @ Yield | 5.3 | 0.1 | 5.3 | 0.1 | 5.3 | 0.1 | % | Type 1 N > 5 |
| Tensile Elongation @ Break | 27 | 4 | 23.6 | 2 | 22 | 5 | | |
| Tensile Yield Stress | 23 | | 32 | | 43 | | MPa | |
| Tensile Break Stress | 28.2 | 0.4 | 32.7 | 0.4 | 40 | 0.3 | | |

TABLE 4C

Tensile Behavior, Formulation 2

| Property | UV + Thermal or Fusion Line, 5 mm/min | | UV + Thermal or Fusion Line, 50 mm/min | | UV + Thermal or Fusion Line, 500 mm/min | | | |
|---|---|---|---|---|---|---|---|---|
| | Value | STDEV | Value | STDEV | Value | STDEV | Units | Method |
| Tensile Modulus | 436 | 30 | 593 | 29 | 666 | 41 | MPa | D638M |
| Tensile Elongation @ Yield | 5 | 0.1 | 5 | 0.1 | 5 | 0.1 | % | Type 1 N > 5 |
| Tensile Elongation @ Break | 38 | 3 | 38 | 2 | 26 | 3 | | |
| Tensile Yield Stress | 11.5 | | 16 | | 22.5 | | MPa | |
| Tensile Break Stress | 17.9 | 0.8 | 22.1 | 0.9 | 25.7 | 0.7 | | |

TABLE 4D

Tensile Behavior, Formulation 3 (Comparative)

| Property | UV + Thermal or Fusion Line, 5 mm/min | | UV + Thermal or Fusion Line, 50 mm/min | | UV + Thermal or Fusion Line, 500 mm/min | | | |
|---|---|---|---|---|---|---|---|---|
| | Value | STDEV | Value | STDEV | Value | STDEV | Units | Method |
| Tensile Modulus | 465 | 20 | 660 | 29 | 702 | 19 | MPa | D638M |
| Tensile Elongation @ Yield | 5 | 0.1 | 5 | 0.1 | 5 | 0.1 | % | Type 1 N > 10 |
| Tensile Elongation @ Break | 42 | 1 | 38 | 3.5 | 36 | 3 | | |
| Tensile Yield Stress | 12 | 0.2 | 17 | 0.6 | 24 | 1 | MPa | |
| Tensile Break Stress | 20.4 | 0.5 | 22.5 | 1 | 27.6 | 0.9 | | |

Discussion of Results

As can be seen from the results depicted in Tables 4A to 4D, various compositions according to the present invention yield one or more enhanced performance characteristics, such as cure speed (evidenced by $E_c$, $E_{10}$ and/or $D_p$ values), glass transition behavior (evidenced by E" breadth and/or Tan Delta), and/or tensile behavior (evidenced by tensile modulus, tensile elongation at yield, tensile elongation at break, tensile yield stress, and/or tensile break stress).

ADDITIONAL EXEMPLARY EMBODIMENTS

The following additional embodiments are meant to further illustrate various potential non-limiting aspects of the present invention. The invention is not intended to be limited globally to any specific embodiments described herein, and various combinations and/or variations of the following can be readily contemplated.

A first embodiment of a first additional exemplary aspect of the invention is a radiation curable composition for additive fabrication comprising, consisting of, or consisting essentially of:

a reactive component and an initiator component;

wherein the reactive component comprises, consists of, or consists essentially of (i) a urethane (meth)acrylate compound; and (ii) a multifunctional (meth)acrylate compound other than (i).

Another embodiment of the first additional exemplary aspect is the radiation curable composition according to the previous embodiment, wherein the radiation curable composition is configured to possesses, after a curing process as described elsewhere herein, the following:

(a) an E10 value of less than or equal to 30;

(b) overall part dimensions which will not deviate by more than 0.2 mm when printed at an intensity that produces cure depths of 0.100 mm to 0.140 mm with a programmed layer by layer thickness of 0.100 mm, wherein the measurement is taken after and in accordance with post-curing and conditioning procedures as described elsewhere herein; and (c) an elongation at break which will deviate less than 20% over a 10× rate change in draw speed/strain rate under 100 mm/min, or less than 35% over a 100× rate change in draw speed/strain rate under 500 mm/min.

Another embodiment of the first additional exemplary aspect is the radiation curable composition according to any of the previous embodiments of the first additional exemplary aspect, wherein the composition is configured to possess, after a curing process as described elsewhere herein, one or more than one of the following:

a. a glass transition value occurring within a temperature range of −30° C. to +30° C.;

b. an E" peak occurring within a temperature range of −50° C. to +40° C.; and c. an E' transition onset occurring within a temperature range of 0° C. and +40° C.

Another embodiment of the first additional exemplary aspect is the radiation curable composition according to any of the previous embodiments of the first aspect, wherein each of conditions a), b), and c) are satisfied.

Another embodiment of the first additional exemplary aspect is the radiation curable composition according to any of the previous embodiments of the first aspect, wherein the urethane (meth)acrylate compound is a reaction product of a diisocyanate, a polyether polyol, and a hydroxy-functional (meth)acrylate.

Another embodiment of the first additional exemplary aspect is the radiation curable composition according to any of the previous embodiments of the first additional exemplary aspect, wherein the urethane (meth)acrylate compound possess a number average molecular weight (Mn) value from 750 to 10000 g/mol, or 1000 to 7000 g/mol, or 1000 to 6000 g/mol, or 1000 to 5000 g/mol, or 1000 to 4000 g/mol, or 2000 to 8000 g/mol, or 2000 to 7000 g/mol, or 2000 to 6000 g/mol, or 2000 to 5000 g/mol, or 2000 to 4000 g/mol, or 3000 to 8000 g/mol, or 3000 to 7000 g/mol, or 3000 to 6000 g/mol, or 3000 to 5000 g/mol, or 4000 to 8000 g/mol, or 4000 to 7000 g/mol, or 750 to 6000 g/mol; preferably from 750 to 4000 g/mol; wherein Mn is determined via a size exclusion chromatography (SEC) method as described elsewhere herein.

Another embodiment of the first additional exemplary aspect is the radiation curable composition according to any of the previous embodiments of the first additional exemplary aspect, wherein the urethane (meth)acrylate compound possesses an uncured Tg, as measured by differential scanning calorimetry, of less than 10° Celsius, or less than 0° C., or from −50 to 10° C., or from −30 to 10° C., or from −20 to 10° C.

Another embodiment of the first additional exemplary aspect is the radiation curable composition according to any of the previous embodiments of the first additional exemplary aspect, wherein the urethane (meth)acrylate compound comprises a number average from 0.9 to 2.1 polymerizable groups, or from 0.9 to 1.1 polymerizable groups, or from 0.9 to 3.1 polymerizable groups, or from 2.9 to 3.1 polymerizable groups, or from 1.9 to 2.1 polymerizable groups.

Another embodiment of the first additional exemplary aspect is the radiation curable composition according to any of the previous embodiments of the first additional exemplary aspect, wherein the polymerizable groups consist of, or consist essentially of, acrylate groups.

Another embodiment of the first additional exemplary aspect is the radiation curable composition according to any of the previous embodiments of the first additional exemplary aspect, wherein the urethane (meth)acrylate compound is present, in an amount relative to the entire composition, from 40 to 95 wt. %, or from 50 to 95 wt. %, or from 55 to 95 wt. %, or from 60 to 95 wt. %, or from 65 to 95 wt. %, or from 70 to 95 wt. %, or from 75 to 95 wt. %, or from 80 to 95 wt. %, or from 50 to 90 wt. %, or from 60 to 90 wt. %, or from 60 to 90 wt. %, or from 80 to 90 wt. %, or from 60 to 85 wt. %, or from 65 to 85 wt. %, or from 70 to 85 wt. %.

Another embodiment of the first additional exemplary aspect is the radiation curable composition according to any of the previous embodiments of the first additional exemplary aspect, wherein the multifunctional (meth)acrylate compound other than (i) possess an Mn value of less than 750 g/mol, or from 150 to 750 g/mol, or from 200 to 500 g/mol; and further possesses a number average of 1.9 to 3.1 functional groups, or from 1.9 to 2.1 polymerizable groups.

Another embodiment of the first additional exemplary aspect is the radiation curable composition according to any of the previous embodiments of the first additional exemplary aspect, wherein the multifunctional (meth)acrylate compound other than (i) comprises, consist of, or consists essentially of bisphenol A glycidyl methacrylate, a triethylene glycol dimethacrylate, a trimethylhexamethylene diisocyanate di(hydroxyethyl)methacrylate, or a methacrylate-terminated isocyanate comprising a methacrylate-terminated moiety and an isocyanate moiety, or mixtures thereof.

Another embodiment of the first additional exemplary aspect is the radiation curable composition according to any of the previous embodiments of the first additional exemplary aspect, wherein the multifunctional (meth)acrylate compound other than (i) is present in amount, relative to the weight of the entire composition, of greater than 15 wt. %, or greater than 20 wt. %; or from 15 to wt. %, or from 15 to 40 wt. %, or from 15 to 30 wt. %, or from 15 to 25 wt. %, or from 20 to 50 wt. %, or from 20 to 40 wt. %, or from 20 to 30 wt. %.

Another embodiment of the first additional exemplary aspect is the radiation curable composition according to any of the previous embodiments of the first additional exemplary aspect, wherein the reactive component further comprises (iii) a monofunctional (meth)acrylate compound other than (i).

Another embodiment of the first additional exemplary aspect is the radiation curable composition according to any of the previous embodiments of the first additional exemplary aspect, wherein (iii) comprises benzyl methacrylate, 2-hydroxypropyl methacrylate, isopropylideneglycerol methacrylate, glycerol formal methacrylate, lauryl methacrylate, a methacrylate-functional compound that contains the residue of a polypropylene oxide, or tetrahydrofurfuryl methacrylate, or combinations thereof.

Another embodiment of the first additional exemplary aspect is the radiation curable composition according to any of the previous embodiments of the first additional exemplary aspect, wherein the monofunctional (meth)acrylate compound other than (i) is present, relative to the weight of the entire composition, from 1 to 50 wt %, or from 1 to 40 wt. %, or from 1 to 25 wt. %, or from 10 to 50 wt. %, or from 10 to 40 wt. %, or from 10 to 25 wt. %.

Another embodiment of the first additional exemplary aspect is the radiation curable composition according to any of the previous embodiments of the first additional exemplary aspect, wherein the initiator component comprises a photoinitiator.

Another embodiment of the first additional exemplary aspect is the radiation curable composition according to any of the previous embodiments of the first additional exemplary aspect, wherein the photoinitiator comprise a component having a phosphine oxide moiety.

Another embodiment of the first additional exemplary aspect is the radiation curable composition according to any of the previous embodiments of the first additional exemplary aspect, wherein the photoinitiator component is present in an amount, relative to the weight of the entire composition, from 0.5 to 15 wt. %, or from 1 to 10 wt. %, or from 1 to 5 wt. %.

Another embodiment of the first additional exemplary aspect is the radiation curable composition according to any of the previous embodiments of the first additional exemplary aspect, wherein the composition further comprises a toughening additive component.

Another embodiment of the first additional exemplary aspect is the radiation curable composition according to any of the previous embodiments of the first additional exemplary aspect, wherein the toughening additive component is present, relative to the weight of the entire composition, from 0.1 to 15 wt. %.

Another embodiment of the first additional exemplary aspect is the radiation curable composition according to any of the previous embodiments of the first additional exemplary aspect, wherein the toughening additive component comprises one or both of liquid rubber tougheners and core/shell impact modifiers.

Another embodiment of the first additional exemplary aspect is the radiation curable composition according to any of the previous embodiments of the first additional exemplary aspect, further comprising an inorganic filler component.

Another embodiment of the first additional exemplary aspect is the radiation curable composition according to any of the previous embodiments of the first additional exemplary aspect, wherein the inorganic filler component comprises silica nanoparticles and/or silica microparticles.

Another embodiment of the first additional exemplary aspect is the radiation curable composition according to any of the previous embodiments of the first additional exemplary aspect, wherein the composition contains from 0 to 0.1, or from 0.01 to 0.08, or from 0.03 to 0.065, or from to 0.055 equivalents of acrylate groups.

Another embodiment of the first additional exemplary aspect is the radiation curable composition according to any of the previous embodiments of the first additional exemplary aspect, wherein the composition contains from 0.2 to 0.3, or from 0.22 to 0.27, or from 0.20 to 0.33 equivalents of methacrylate groups.

Another embodiment of the first additional exemplary aspect is a three-dimensional object formed by the composition according to any of the embodiments of the first additional exemplary aspect as specified herein, above.

A first embodiment of a second additional exemplary aspect of the invention is a radiation a radiation curable composition for additive fabrication comprising, consisting of, or consisting essentially of, relative to the entire weight of the composition:

from 40 to 95 wt. %, based on the total weight of the composition, of (i) a urethane (meth)acrylate oligomer having at least one polymerizable group;

from 0 to less than 40 wt. % of a (ii) monofunctional reactive diluent monomer; and greater than 20 wt. % of (iii) one or more methacrylate-functional compounds comprising a number average of greater than 1.5 polymerizable groups.

An additional embodiment of the second additional exemplary aspect of the invention is the previous embodiment of the second additional exemplary aspect, wherein the urethane (meth)acrylate oligomer (i) is the reaction product of a diisocyanate, a polyether polyol, and a hydroxy-functional (meth)acrylate.

An additional embodiment of the second additional exemplary aspect of the invention is either of the previous two embodiments of the second additional exemplary aspect, further wherein at least one of the polymerizable groups of the compound according to (iii) is (co)polymerizable with the at least one polymerizable group of the oligomer according to (i) and/or (ii).

Another embodiment of the second additional exemplary aspect is the radiation curable composition according to any of the previous embodiments of the second additional exemplary aspect, wherein the compound according to (iii) possesses a number average molecular weight (Mn) value that is less than the Mn value of the oligomer according to (i) and greater than the Mn of the monomer according to (ii).

Another embodiment of the second additional exemplary aspect is the radiation curable composition according to any of the previous embodiments of the second additional exemplary aspect, wherein Mn is measured by size exclusion chromatography (SEC) method as described elsewhere herein.

Another embodiment of the second additional exemplary aspect is the radiation curable composition according to any of the previous embodiments of the second additional exemplary aspect, further comprising one or more photoinitiators.

Another embodiment of the second additional exemplary aspect is the radiation curable composition according to any of the previous embodiments of the second additional exemplary aspect, further comprising one or more additives.

Another embodiment of the second additional exemplary aspect is the radiation curable composition according to any of the previous embodiments of the second additional exemplary aspect, wherein the urethane (meth)acrylate oligomer possess an Mn value from 750 to 10000 g/mol, or 1000 to 7000 g/mol, or 1000 to 6000 g/mol, or 1000 to 5000 g/mol, or 1000 to 4000 g/mol, or 2000 to 8000 g/mol, or 2000 to 7000 g/mol, or 2000 to 6000 g/mol, or 2000 to 5000 g/mol, or 2000 to 4000 g/mol, or 3000 to 8000 g/mol, or 3000 to 7000 g/mol, or 3000 to 6000 g/mol, or 3000 to 5000 g/mol, or 4000 to 8000 g/mol, or 4000 to 7000 g/mol, or 750 to 6000 g/mol; preferably from 750 to 4000 g/mol.

Another embodiment of the second additional exemplary aspect is the radiation curable composition according to any of the previous embodiments of the second additional exemplary aspect, wherein the compound(s) according to (iii) possess an Mn value of less than 750 g/mol; and further possesses a number average of 1.9 to 3.1 functional groups, or from 1.9 to 2.1 polymerizable groups.

Another embodiment of the second additional exemplary aspect is the radiation curable composition according to any of the previous embodiments of the second additional exemplary aspect, wherein the oligomer(s) according to (i) possesses an uncured Tg, as measured by differential scanning calorimetry, of less than 10° Celsius, or less than 0° C., or from −50 to 10° C., or from −30 to 10° C., or from −20 to 10° C.

Another embodiment of the second additional exemplary aspect is the radiation curable composition according to any of the previous embodiments of the second additional exemplary aspect, wherein the oligomer(s) according to (i) are present by weight, relative to the entire composition, from 50 to 95 wt. %, or from 55 to 95 wt. %, or from 60 to 95 wt. %, or from 65 to 95 wt. %, or from 70 to 95 wt. %, or from 75 to 95 wt. %, or from 80 to 95 wt. %, or from 50 to 90 wt. %, or from 60 to 90 wt. %, or from 60 to 90 wt. %, or from 80 to 90 wt. %, or from 60 to 85 wt. %, or from 65 to 85 wt. %, or from 70 to 85 wt. %.

Another embodiment of the second additional exemplary aspect is the radiation curable composition according to any of the previous embodiments of the second additional exemplary aspect, wherein the oligomer(s) according to (i) comprises the reaction product of isophorone diisocyanate, hexane diisocyanate, 2,2,4-trimethyl hexane diisocyanate, 2,4,4-trimethylhexane diisocyanate, pentane diisocyanate or 4,4-methylene bis(cyclohexyl isocyanate), or mixtures thereof.

Another embodiment of the second additional exemplary aspect is the radiation curable composition according to any of the previous embodiments of the second additional exemplary aspect, wherein the oligomer(s) according to (i) comprise the reaction product of a polyol having an Mn from 200 to 6000 g/mol, or from 150 to 1000 g/mol, or from about 150 to about 500, or from about 150 to about 300, or from about 150 to about 250 g/mol, wherein the polyol comprises polyethylene glycol, polypropylene glycol, poly THF, polybutylene oxide, polyethylene co-propylene oxide, or polyethyleneoxide-block-propylene oxide, or mixtures thereof.

Another embodiment of the second additional exemplary aspect is the radiation curable composition according to any of the previous embodiments of the second additional exemplary aspect, wherein the oligomer(s) according to (i) comprise the reaction product of hydroxy ethyl methacrylate, 1-hydroxypropyl methacrylate, 2-hydroxypropyl methacrylate, 1-hydroxybutyl methacrylate, diethylene glycol methacrylate, dipropylene glycol methacrylate, or caprolactone 2-(methacryloyloxy)ethyl ester, or mixtures thereof.

Another embodiment of the second additional exemplary aspect is the radiation curable composition according to any of the previous embodiments of the second additional exemplary aspect, wherein the oligomer(s) according to (i) comprise a number average from 0.9 to 2.1 polymerizable groups, or from 0.9 to 1.1 polymerizable groups, or from 0.9 to 4.1 polymerizable groups, or from 0.9 to 3.1 polymerizable groups, or from 1.9 to 4.1 polymerizable groups, or from 2.9 to 4.1 polymerizable groups, or from 1.9 to 2.1 polymerizable groups.

Another embodiment of the second additional exemplary aspect is the radiation curable composition according to any of the previous embodiments of the second additional exemplary aspect, wherein the polymerizable groups comprise, consist of, or consist essentially of acrylate groups.

Another embodiment of the second additional exemplary aspect is the radiation curable composition according to any of the previous embodiments of the second additional exemplary aspect, wherein the compound(s) according to (ii) comprise, consist of, or consist essentially of monofunctional urethane methacrylates.

Another embodiment of the second additional exemplary aspect is the radiation curable composition according to any of the previous embodiments of the second additional exemplary aspect, wherein the compound(s) according to (ii) comprise, consist of, or consist essentially of isopropylideneglycerol methacrylate (IPGMA), (hydroxyethyl)methacrylate (HEMA), 2-hydroxypropyl methacrylate (HPMA), benzyl methacrylate (BMA), cyclohexyl methacrylate, isobornyl methacrylate, or 4-tbutylcyclohexyl methacrylate, THFmethacrylate, phenyl methacrylate, 2,2,4-trmethylcyclohexyl methacrylate, or mixtures thereof.

Another embodiment of the second additional exemplary aspect is the radiation curable composition according to any of the previous embodiments of the second additional exemplary aspect, wherein the compound(s) according to (iii) comprise, consist of, or consist essentially of bisphenol A glycidyl methacrylate, a triethylene glycol dimethacrylate, a trimethylhexamethylene diisocyanate di(hydroxyethyl) methacrylate, or a methacrylate-terminated isocyanate comprising a methacrylate-terminated moiety and an isocyanate moiety, or mixtures thereof.

Another embodiment of the second additional exemplary aspect is the radiation curable composition according to any of the previous embodiments of the second additional exemplary aspect, wherein the compound(s) according to (iii) comprise, consist of, or consist essentially of difunctional compounds having a number average molecular weight from 150 to 750 g/mol, or from 200 to 500 g/mol.

Another embodiment of the second additional exemplary aspect is the radiation curable composition according to any of the previous embodiments of the second additional exemplary aspect, wherein the compound(s) according to (iii) are present, relative to the weight of the entire composition, from 15 to 55 wt. %, or from 15 to 40 wt. %, or from 15 to 30 wt. %, or from 15 to 25 wt. %, or from 20 to 50 wt. %, or from 20 to 40 wt. %, or from 20 to 30 wt. %.

Another embodiment of the second additional exemplary aspect is the radiation curable composition according to any of the previous embodiments of the second additional exemplary aspect, wherein the photoinitiator(s) are present in an amount, relative to the weight of the entire composition, from 0.1 to 10 wt. %, or from 0.5 to 8 wt. %, or from 1 to 7 wt. %.

Another embodiment of the second additional exemplary aspect is the radiation curable composition according to any of the previous embodiments of the second additional exemplary aspect, wherein the additives comprise fillers and/or impact modifiers.

Another embodiment of the second additional exemplary aspect is the radiation curable composition according to any of the previous embodiments of the second additional exemplary aspect, wherein the additives are present, relative to the weight of the entire composition, from 1 to wt. %.

Another embodiment of the second additional exemplary aspect is the radiation curable composition according to any of the previous embodiments of the second additional exemplary aspect, wherein the polymerizable groups in the compound(s) according to (i) consist of or consist essentially of acrylate groups, and wherein the polymerizable groups in the compound(s) according to (iii) consist of, or consist essentially of methacrylate groups.

Another embodiment of the second additional exemplary aspect is the radiation curable composition according to any of the previous embodiments of the second additional exemplary aspect, wherein the composition contains from 0 to 0.1, or from 0.01 to 0.08, or from 0.03 to 0.065, or from 0.03 to 0.055 equivalents of acrylate groups.

Another embodiment of the second additional exemplary aspect is the radiation curable composition according to any of the previous embodiments of the second additional exemplary aspect, wherein the composition contains from 0.2 to 0.3, or from 0.22 to 0.27, or from 0.20 to 0.33 equivalents of methacrylate groups.

A first embodiment of a third additional exemplary aspect of the invention is a method of producing a three-dimensional part via an additive fabrication process, the method comprising:

a. providing a first layer of a radiation curable composition, thereby forming a first surface;
b. optionally, heating at least a portion of the first layer of the radiation curable composition;
c. exposing at least a portion of the first layer of the radiation curable composition imagewise to actinic radiation to form a cured cross-section;
d. providing an additional layer of a radiation curable composition onto at least a portion of the cured cross-section to form an additional layer of the radiation curable composition;
e. exposing at least a portion of the additional layer of the radiation curable composition imagewise to actinic radiation to form an additional cured cross-section;
f. repeating steps (d) and (e) a plurality of times in order to form a three-dimensional object which is the cured product of the radiation curable composition;
   wherein the radiation curable composition is defined by the composition according to any of the embodiments of the first additional exemplary aspect or the second additional exemplary aspect.

An additional embodiment of the third additional exemplary aspect of the invention is the method according to the previous embodiment, wherein a linear polymer formed from the oligomer(s) according to (i) has a Tg between −80 to 20° C., or from −30 to 20° C., or between −80 to −10° C., wherein the Tg is determined in accordance with a method as described elsewhere herein.

An additional embodiment of the third additional exemplary aspect is a three dimensional article which is the cured product of a composition according to any of the previous embodiments of the first or second additional exemplary aspects of the invention and/or via the method according to either of the previous two embodiments of the third additional exemplary aspect of the invention.

Unless otherwise specified, the term wt. % means the amount by mass of a particular constituent relative to the entire liquid radiation curable composition for additive fabrication into which it is incorporated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventor for carrying out the invention. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

While the invention has been described in detail and with reference to specific embodiments thereof, it will be apparent to one of ordinary skill in the art that various changes and modifications can be made therein without departing from the spirit and scope of the claimed invention.

What is claimed is:

1. A radiation curable composition for additive fabrication comprising, relative to the entire weight of the composition:
   from 40 to 95 wt. %, based on the total weight of the composition, of a (i) urethane (meth)acrylate oligomer having at least one polymerizable group,
      wherein the urethane (meth)acrylate oligomer is the reaction product of a diisocyanate, a polyether polyol, and a hydroxy-functional (meth)acrylate;

from 0 to less than 40 wt. % of (ii) a monofunctional reactive diluent monomer;

greater than 20 wt. % of (iii) one or more methacrylate-functional compounds comprising a number average of greater than 1.5 polymerizable groups;

wherein at least one of the polymerizable groups of the compound according to (iii) is (co)polymerizable with the at least one polymerizable group of the oligomer according to (i) and/or (ii); and wherein the compound according to (iii) possesses a number average molecular weight (Mn) value that is less than the Mn value of the oligomer according to (i) and greater than the Mn of the monomer according to (ii);

wherein Mn is measured by size exclusion chromatography (SEC) method.

2. The radiation curable composition according to claim 1, further comprising, relative to the weight of the entire composition, from 0.5 to 8 wt. % of one or more photoinitiators; and/or from 1 to 40 wt. % of one or more additives; wherein the additives further comprise fillers and/or impact modifiers.

3. The radiation curable composition according to claim 1, wherein the urethane (meth)acrylate oligomer (i) possess an Mn value from 750 to 10000 g/mol; and/or wherein the compound(s) according to (iii) possess an Mn value of less than 750 g/mol and a number average from 1.9 to 3.1, or from 1.9 to 2.1 polymerizable groups.

4. The radiation curable composition according to claim 1, wherein the oligomer(s) according to (i) possesses an uncured Tg, as measured by differential scanning calorimetry, from −50 to 10° C.; and/or wherein the oligomer(s) according to (i) possess a number average from 0.9 to 2.1, or from 1.9 to 2.1 polymerizable groups.

5. The radiation curable composition according to claim 1, wherein the oligomer(s) according to (i) are present by weight, relative to the entire composition, from 50 to 95 wt. %.

6. The radiation curable composition according to claim 1, wherein the oligomer(s) according to (i) comprises the reaction product of isophorone diisocyanate, hexane diisocyanate, 2,2,4-trimethyl hexane diisocyanate, 2,4,4-trimethylhexane diisocyanate, pentane diisocyanate or 4,4-methylene bis(cyclohexyl isocyanate), or mixtures thereof;

and/or wherein the oligomer(s) according to (i) comprise the reaction product of a polyol having an Mn from 200 to 6000 g/mol, wherein the polyol comprises polyethylene glycol, polypropylene glycol, poly THF, polybutylene oxide, polyethylene co-propylene oxide, or polyethylene oxide-block-propylene oxide, or mixtures thereof.

7. The radiation curable composition according to claim 1, wherein the oligomer(s) according to (i) comprise the reaction product of hydroxy ethyl methacrylate, 1-hydroxypropyl methacrylate, 2-hydroxypropyl methacrylate, 1-hydroxybutyl methacrylate, diethylene glycol methacrylate, dipropylene glycol methacrylate, or caprolactone 2-(methacryloyloxy) ethyl ester, or mixtures thereof.

8. The radiation curable composition according to claim 1, wherein the polymerizable groups comprises acrylate groups.

9. The radiation curable composition according to claim 1, wherein the compound(s) according to (ii) comprises monofunctional urethane methacrylates.

10. The radiation curable composition according to claim 1, wherein the compound(s) according to (ii) comprises isopropylideneglycerol methacrylate (IPGMA), (hydroxyethyl) methacrylate (HEMA), 2-hydroxypropyl methacrylate (HPMA), benzyl methacrylate (BMA), cyclohexyl methacrylate, isobornyl methacrylate, or 4-tbutylcyclohexyl methacrylate, THFmethacrylate, phenyl methacrylate, 2,2,4-trmethylcyclohexyl methacrylate, or mixtures thereof.

11. The radiation curable composition according to claim 10, wherein the compound(s) according to (iii) comprises bisphenol A glycidyl methacrylate, a triethylene glycol dimethacrylate, a trimethylhexamethylene diisocyanate di(hydroxyethyl) methacrylate, or a methacrylate-terminated isocyanate comprising a methacrylate-terminated moiety and an isocyanate moiety, or mixtures thereof.

12. The radiation curable composition according to claim 1, wherein the compound(s) according to (iii) comprises difunctional compounds having a number average molecular weight from 150 to 750 g/mol; and/or wherein the compound(s) according to (iii) are present, relative to the weight of the entire composition, from 15 to 55 wt. %.

13. The radiation curable composition according to claim 1, wherein the polymerizable groups in the compound(s) according to (i) consist of acrylate groups, and wherein the polymerizable groups in the compound(s) according to (iii) consist of methacrylate groups.

14. The radiation curable composition according to claim 1, wherein the composition contains from 0 to 0.1 equivalents of acrylate groups; and/or from 0.2 to 0.3 equivalents of methacrylate groups.

15. The method according to claim 1, wherein a linear polymer formed from the oligomer(s) according to (i) has a Tg between-80 to 20° C.

* * * * *